(12) United States Patent
Sakai et al.

(10) Patent No.: US 8,221,111 B2
(45) Date of Patent: Jul. 17, 2012

(54) MOLD, METHOD OF FORMING THE SAME, AND METHOD OF PRODUCING POLYCRYSTALLINE SILICON SUBSTRATE USING THE MOLD

(75) Inventors: Youhei Sakai, Higashiohmi (JP); Yoshiyuki Amano, Higashiohmi (JP)

(73) Assignee: Kyocera Corporation, Kyoto (JP)

( * ) Notice: Subject to any disclaimer, the term of this patent is extended or adjusted under 35 U.S.C. 154(b) by 743 days.

(21) Appl. No.: 10/597,514

(22) PCT Filed: Jan. 27, 2005

(86) PCT No.: PCT/JP2005/001545
§ 371 (c)(1),
(2), (4) Date: Jul. 27, 2006

(87) PCT Pub. No.: WO2005/073129
PCT Pub. Date: Aug. 11, 2005

(65) Prior Publication Data
US 2008/0230678 A1   Sep. 25, 2008

(30) Foreign Application Priority Data

Jan. 29, 2004   (JP) .................................. 2004-21174
Mar. 29, 2004   (JP) .................................. 2004-96814

(51) Int. Cl.
*B22C 9/06*   (2006.01)
(52) U.S. Cl. ...................... 425/451.9; 425/441; 425/442; 425/468; 425/78; 249/117; 249/160; 249/168; 117/213; 117/215; 117/223
(58) Field of Classification Search .................. 425/412, 425/414, 441, 442, 451.9, 468, DIG. 58, 425/182, 78; 117/213, 215, 223; 164/122.2, 164/169; 249/117, 168, 160
See application file for complete search history.

(56) References Cited

U.S. PATENT DOCUMENTS

| | | | | |
|---|---|---|---|---|
| 1,386,003 A * | 8/1921 | Kempton | | 264/324 |
| 1,512,018 A * | 10/1924 | Frazer | | 164/394 |
| 1,523,203 A * | 1/1925 | Howard et al. | | 249/106 |
| 1,572,705 A * | 2/1926 | Chapin | | 264/336 |
| 1,572,706 A * | 2/1926 | Chapin | | 249/152 |

(Continued)

FOREIGN PATENT DOCUMENTS

FR   2500768 A1   9/1982

(Continued)

OTHER PUBLICATIONS

Japanese Publication No. 11-11924 corresponds to U.S. Patent No. 6,136,091.

(Continued)

*Primary Examiner* — Joseph Del Sole
*Assistant Examiner* — Seyed Masoud Malekzadeh
(74) *Attorney, Agent, or Firm* — DLA Piper LLP (US)

(57) ABSTRACT

Disclosed is a mold wherein one bottom surface member (2) and four lateral surface members (3) are assembled. The sides of each lateral surface member (3) are respectively provided with a projection (5) and a recess (6) for combining the lateral surface members together, and the projection (5) of one lateral surface member (3) is engaged with the recess (6) of the adjacent lateral surface member (3). By using the one bottom surface member (2) and four lateral surface members (3), a mold can be assembled or disassembled without using screw or bolts. Consequently, the assembly or disassembly work of the mold is dramatically simplified, thereby improving work efficiency significantly.

18 Claims, 14 Drawing Sheets

U.S. PATENT DOCUMENTS

| | | | | |
|---|---|---|---|---|
| 1,663,450 A * | 3/1928 | Emil | | 249/197 |
| 1,952,817 A * | 3/1934 | Neary | | 217/12 R |
| 2,039,872 A * | 5/1936 | Aldrich | | 249/204 |
| 2,056,673 A * | 10/1936 | Howard | | 164/95 |
| 2,057,942 A * | 10/1936 | Fay | | 446/112 |
| 2,086,212 A * | 7/1937 | Charlton | | 249/161 |
| 2,433,803 A * | 12/1947 | Woodworth | | 249/197 |
| 2,465,977 A * | 3/1949 | Marburg | | 249/197 |
| 2,691,242 A * | 10/1954 | Young | | 446/115 |
| 2,914,825 A * | 12/1959 | Marburg | | 249/198 |
| 2,919,045 A * | 12/1959 | Waugh et al. | | 220/4.34 |
| 3,060,533 A * | 10/1962 | Marburg | | 249/198 |
| 3,165,798 A * | 1/1965 | La Bate | | 249/62 |
| 3,246,828 A * | 4/1966 | Branscum et al. | | 220/4.34 |
| 3,591,212 A * | 7/1971 | Rhyne | | 217/65 |
| 3,692,201 A * | 9/1972 | Garduna | | 217/12 R |
| 3,743,455 A * | 7/1973 | Green | | 425/78 |
| 3,892,098 A * | 7/1975 | Kobori | | 52/270 |
| 3,898,051 A * | 8/1975 | Schmid | | 117/83 |
| 3,905,740 A * | 9/1975 | Lovejoy | | 425/438 |
| 3,924,376 A * | 12/1975 | Tsurumi | | 52/591.1 |
| 4,173,287 A * | 11/1979 | Kumakawa | | 217/65 |
| 4,175,610 A * | 11/1979 | Zauhar et al. | | 164/122.2 |
| 4,218,418 A * | 8/1980 | Schmid et al. | | 264/299 |
| 4,702,299 A * | 10/1987 | Gravemann | | 164/137 |
| 5,135,382 A * | 8/1992 | Tsuchiya et al. | | 425/330 |
| 5,161,709 A * | 11/1992 | Oestreich, Jr. | | 220/6 |
| 5,183,615 A * | 2/1993 | Zushi | | 264/219 |
| 5,357,728 A * | 10/1994 | Duncanson | | 52/592.4 |
| 5,361,923 A * | 11/1994 | Knight, IV et al. | | 220/6 |
| 5,490,604 A * | 2/1996 | Alexander | | 220/4.34 |
| 5,632,392 A * | 5/1997 | Oh | | 220/7 |
| 5,671,857 A * | 9/1997 | Stromberg | | 220/7 |
| 5,765,707 A * | 6/1998 | Kenevan | | 220/4.28 |
| 5,895,045 A * | 4/1999 | Vilar | | 273/160 |
| 6,136,091 A | 10/2000 | Yamazaki et al. | | 117/81 |
| 6,202,847 B1 * | 3/2001 | Hardy et al. | | 206/509 |
| 6,216,872 B1 * | 4/2001 | Haasbroek | | 206/512 |
| 6,253,520 B1 * | 7/2001 | Houk | | 52/592.2 |
| 6,413,674 B1 * | 7/2002 | Mizobuchi et al. | | 429/255 |
| 6,577,699 B1 * | 6/2003 | Minshall | | 376/272 |
| 6,843,386 B2 * | 1/2005 | Raghunathan et al. | | 220/7 |
| 7,017,766 B2 * | 3/2006 | Hsu et al. | | 220/7 |
| 7,159,730 B2 * | 1/2007 | Rumpel | | 220/7 |
| 7,617,645 B2 * | 11/2009 | Moriau et al. | | 52/384 |
| 2003/0159647 A1 * | 8/2003 | Arvidson et al. | | 117/30 |
| 2006/0174578 A1 * | 8/2006 | Konstanczak | | 52/589.1 |

FOREIGN PATENT DOCUMENTS

| | | |
|---|---|---|
| JP | 62-108515 | 5/1987 |
| JP | 06-144824 | 5/1994 |
| JP | 10-182285 | 7/1998 |
| JP | 10-188285 A | 7/1998 |
| JP | 10-190025 | 7/1998 |
| JP | 11-11924 | 1/1999 |
| JP | 2001029781 A | 6/2001 |

OTHER PUBLICATIONS

Takeshi Saito, et al. "A New Directional Solidification Technique for Polycrystalline Solar Grade Silicon" 15th Photovoltaic Specialist Conference 1981, pp. 576-580.

Prem Prakash, et al. "Use of Silicon Oxynitride as a Graphite Mold Releasing Coating for the Growth of Shaped Multicrystalline Silicon Crystals", Journal of Crystal Growth, Elsevier, Amsterda, NL, vol. 144, No. 1/02.

English translation of Japanese language office action dated Mar. 22, 2012 issued in corresponding Japanese application 2005517569 cites the foreign patent document above.

* cited by examiner

MOLD, METHOD OF FORMING THE SAME, AND METHOD OF PRODUCING POLYCRYSTALLINE SILICON SUBSTRATE USING THE MOLD

CROSS-REFERENCE TO THE RELATED APPLICATIONS

This application is a national phase of PCT application No. PCT/JP2005/001545 filed Jan. 27, 2005, which also claims benefit of priority under 35 U.S.C. §119 to Japanese Application No. 2004-21174 filed Jan. 29, 2004 and Japanese Application No. 2004-96814 filed Mar. 29, 2004, the entire contents of which are incorporated by reference.

FIELD OF THE INVENTION

The present invention relates to a mold suited to cast a polycrystalline silicon ingot used for a silicon substrate for a solar cell, for example, and more particularly to a mold, which can be assembled and dissembled, comprising one bottom plate and four side plates and a method of forming the same, and a method of producing a polycrystalline silicon substrate using the mold.

DESCRIPTION OF RELATED ART

Practical application of solar cells is expected in a wide field from small-scale domestic purposes to large-scale power generating systems as clean sources of alternative energy to oil. The solar cells are classified into system, such as crystalline, amorphous, and compound depending on the type of raw material to be used. Among them, many of the solar cells currently in the marketplace are crystalline silicon solar cells. The crystalline silicon solar cells are further classified into monocrystalline types and polycrystalline types. The monocrystalline silicon solar cells have advantages that the conversion efficiencies thereof are easily improved because the qualities of substrates are good, while having disadvantages that the production costs of the substrates are high.

On the other hand, the polycrystalline silicon solar cells have been conventionally in the marketplace. However, demands therefor have been increasing in recent years, so that high conversion efficiencies have been required at lower costs. In order to cope with such demands, it is necessary to reduce the costs of the polycrystalline silicon substrates and increase the qualities thereof. Particularly, it is required that high-purity silicon ingots are produced with high yields.

Methods of forming polycrystalline silicon ingots by pouring melts in which silicon is dissolved by heating into molds to solidify the melts in one direction from bottom surfaces of the molds or pouring silicon raw materials into molds to dissolve the silicon raw materials once and then, solidifying the silicon raw materials in one direction from bottom surfaces of the molds have been generally used.

The ingots thus obtained are processed into polycrystalline silicon substrates for solar cells by cutting away the textures of their side surfaces and bottom surfaces having a large number of defects and impurities and their heads having impurities incrassated by solidification and segregation phenomena by thicknesses of not less than several millimeters and slicing the textures thin using multi-wire saws or the like.

Used as such molds have been a mold composed of silicon dioxide ($SiO_2$) such as quartz or molten silica, graphite, or the like superior in shape stability even at a high temperature of approximately 1450° C. for dissolving and solidifying silicon and having a mold release coating mainly composed of silicon nitride ($Si_3N_4$), silicon dioxide ($SiO_2$), or the like formed on its inner surface (see Document [1], for example).

FIG. 16 is a cross-sectional view of a conventional mold 121 formed of silicon dioxide ($SiO_2$) such as quartz or molten silica, graphite, or the like and having a bottom surface and side surfaces integrally formed therein. A mold release material 122 is applied to an inner surface of the mold 121.

Such a integral-type mold 121 cannot be reused because the mold must be destroyed so as to take out a silicon ingot, so that the production cost of the silicon ingot is significantly high.

In order to form the integral-type mold 121, an inner surface of the mold requires a draft angle (taper) for removing a molded object from a metal mold so as to form a raw material into a mold shape by cast molding, press molding, or the like. Therefore, a side surface of the silicon ingot cast by the mold 121 is provided with a reversed taper 123 that spreads toward the head of the ingot from the bottom thereof, so that an end material portion, which will not be a product, is enlarged. Therefore, a high-cost silicon raw material must be removed extra, so that the production cost of the silicon ingot is increased.

In order to take out a silicon ingot from such an integral-type mold without destroying the mold, a method of further providing an inner surface of the mold with a larger taper has been proposed (see Document [2], for example). However, particularly a mold composed of molten silica is difficult to reuse because it is cracked due to differences in a temperature gradient and a sintered state within the mold in the process of cooling a block from a high-temperature state. Further, a mold made of quartz is very difficult to reuse because it wears by its inner surface layer coated with a mold release material being changed into cristoblite and stripped. Therefore, the material yield of the produced silicon ingot is low. From such reasons, the production cost of the silicon ingot is significantly increased.

In order to avoid such problems, a method of producing a plate-shaped bottom surface member and lateral surface members using high-purity graphite and assembling and screwing the members, to produce a mold has been also tried (see Document [3], for example).

FIG. 17 is a perspective view of a conventional assembly-type mold 131 composed of graphite or the like. One bottom surface member 132 and four lateral surface members 133 are joined to each other by driving an assembling screw 134. This allows a silicon ingot to be taken out without destroying the mold 131 differently from the integral-type mold.

Since the mold made of high-purity graphite is high in cost, it must be repeatedly used so as to realize the cost reduction of a polycrystalline silicon ingot. However, as silicon is a material that solidifies and expands because of a higher density in liquid silicon than in solid silicon, when a silicon melt is cooled and set within the mold, the bottom surface member 132 and the lateral surface member 133 in the mold experience stress in the direction in which they spread outward. The assembly-type mold using the assembling screw 134, the stress due to solidification and expansion at the time of cooling and setting of the silicon melt causes shear stress and tensile stress to be applied to a screwed portion of the mold 131, so that the screw 134 fractures, or a thread of the screw 134 is stripped, for example. As a result, joining between the bottom surface member 132 and the lateral surface member 133 is loosened, so that the silicon melt leaks out of the mold, or it becomes impossible to reuse the screw 134 and a mold member.

In order to avoid this problem, a method of providing a silica power layer in a mold release coating in a mold and absorbing stress due to solidification and expansion of silicon by softening and deforming the silica powder layer and a method of changing the wall thickness of a lateral surface member in a mold and changing the direction of stress created at the time of solidification and expansion of silicon into the direction of tensile stress of a screw utilizing the fact that a surface having a small wall thickness is easy to deform to prevent the screw from fracturing have been tried (see Documents [4] and [5]).

However, such a mold assembling screw and a thread such as a female thread processed on the mold side are worn by repetitive use, and a screwed portion and a portion where each of the lateral surface member 133 and the bottom surface member 132 are brought into contact with each other become loose, so that the problem that the silicon melt leaks in the processes of dissolving silicon and cooling and setting the silicon melt fundamentally remains. In a configuration in which the lateral surface member 133 or the bottom surface member 132 in the mold is provided with a thread for attaching a screw, when the thread is stripped, a mold member itself cannot be employed. Therefore, the life of a graphite mold member is short irrespective of high costs, so that the problem that the production cost of a silicon ingot is increased remains.

Such an assembly-type mold using a screw also has a problem that the screw 134 must be attached or detached one at a time in the case of assembling and disassembling, so that it takes much time to perform the work. Further, the bottom surface member 132 and the lateral surface member 133 must be respectively provided with screwed portions, so that the thickness of mold member cannot be reduced. Therefore, the cost of the mold member cannot be reduced, and the production cost of the silicon ingot is increased.

[1] 15th Photovoltaic Specialist Conf. (1981), P576-P580, "A NEW DIRECTIONAL SOLIDIFICATION TECHNIQUE FOR POLYCRYSTALLINE SOLAR GRADE SILICON"
[2] Japanese Unexamined Patent Publication No. 10-190025 A
[3] Japanese Unexamined Patent Publication No. 62-108515 A
[4] Japanese Unexamined Patent Publication No. 6-144824 A
[5] Japanese Unexamined Patent Publication No. 10-182285 A An object of the present invention is to provide a mold for casting a polycrystalline silicon ingot for producing a high-quality silicon ingot at low cost and a method of forming the same as well as a method of producing a polycrystalline silicon substrate using the mold.

SUMMARY OF THE INVENTION

A mold according to the present invention is formed by combining a bottom surface member and a plurality of lateral surface members abutted against the bottom surface member, in which an engaging structure for fixing the adjacent lateral surface members to each other is provided on a side of each of the lateral surface members.

Since the mold having such a configuration need not be provided with a screw hole for attaching a screw to the lateral surface member in the mold, the problem that a thread of the screw is stripped, a mold member itself cannot be employed, and the life of a high-cost graphite mold member is shortened is solved. Consequently, the increase in the production cost of a silicon ingot can be restrained. Assembly and disassembly work of the mold is more dramatically simplified, and working efficiency is more significantly improved, as compared with those in a conventional mold to which a large number of screws or bolts had to be attached for the purpose of fixing.

It is desirable that the engaging structure is a structure in which the projection of one of the lateral surface member and the recess of the other lateral surface member adjacent thereto are engaged with each other, and out of engaging surfaces that are substantially level with a bottom surface of the bottom surface member, a distance between the engaging surface closest to the upper side of the lateral surface member and the upper side is in a range of not less than 1 cm nor more than 8 cm. The setting in this range effectively restrains warping at the top of the lateral surface member, so that the lateral surface member can be kept substantially perpendicular to the bottom surface member.

If the shapes of the engaging structures respectively provided on the sides on both sides of each of the lateral surface members are in an asymmetrical relationship with a center line of the lateral surface member used as a basis, the engaging strength between the lateral surface members is increased, so that the effect of warping and deflection is alleviated.

If the shapes of the engaging structures respectively provided on the sides on both sides of the lateral surface member are in a point-symmetrical relationship, the top and the bottom of the lateral surface member can be reversed. As a result, the life of the mold member can be lengthened. Since all the shapes of the four lateral surface members are the same, the mold is assembled only by the lateral surface members in one type of shape, so that the production cost of the silicon ingot can be restrained.

The bottom surface member has a closed groove for dividing its upper surface into a square bottom surface center and a square bottom surface outer periphery, and the respective bottom sides of the four lateral surface members are engaged with the groove of the bottom surface member so as to surround the bottom surface center with the four lateral surface members combined. The mold can be so configured that wedge members are respectively arranged in clearances between outer peripheral surfaces of the four lateral surface members engaged with the groove of the bottom surface member and the bottom surface outer periphery. The lateral surface members in the mold are pressed by the wedge member, so that a joining portion between the bottom surface member and each of the lateral surface members is firmly fixed at the bottom of the mold to which stress due to the weight of a silicon melt is greatly applied. Therefore, the silicon melt can be prevented from leaking out of the mold, which makes it possible to increase the size of the mold.

The mold may have a configuration in which the bottom surface member is in a square shape, and the four lateral surface members are abutted against a side surface of the bottom surface member, and comprising a mold holder for placing the bottom surface member and the four lateral surface members that are combined, a plurality of wedge receivers arranged on an upper surface of the mold holder, and wedge members respectively arranged in clearances between the outer peripheral surfaces of the four lateral surface members provided upright so as to surround the bottom surface member and the plurality of wedge receivers. The lateral surface members in the mold are pressed by the wedge member, so that a joining portion between the bottom surface member and each of the lateral surface members is firmly fixed at the bottom of the mold to which stress due to the weight of a silicon melt is greatly applied. Therefore, the silicon melt can be prevented from leaking out of the mold, which makes it possible to increase the size of the mold.

Even if the wedge receiver is removable from the upper surface of the mold holder, only the wedge receiver can be independently replaced even when it wears with repetitive use, so that the mold holder need not be replaced, and can be continuously reused. Therefore, the cost of the mold can be reduced.

If a clearance between a wedge receiver selected out of the plurality of wedge receivers and an other wedge receiver arranged at a position opposed thereto on the upper surface of the mold holder can be adjusted, the joining portion between the bottom surface member and each of the lateral surface members can be firmly fixed by adjusting the clearance between the opposed two wedge receivers even when the joining portion between the bottom surface member and the lateral surface member or a surface where the wedge and the wedge receiver are brought into contact with each other wears.

Furthermore, it is preferable that there is provided a frame-shaped member surrounding the outer periphery of the four lateral surface members integrated by engaging the adjacent lateral surface members for constraining displacement between the lateral surface members. The fixing strength of the engaging structure between the lateral surface members is increased by using the frame-shaped member, so that the mold can be increased in size and thinned. Further, even if stress applied to the lateral surface members is large, the lateral surface member can be prevented from warping.

There may be provided a frame-shaped member arranged with play given between the frame-shaped member and the four lateral surface members, and pressing jigs may be respectively driven into clearances between the frame-shaped member and four outer corners formed by the adjacent lateral surface members. The pressing jig allows the lateral surface member to be firmly pressed even if stress applied to the lateral surface member is large and can prevent the lateral surface member from being deflected. Assembly and disassembly work of the mold is dramatically simplified, and working efficiency is significantly improved.

The pressing jig may have two jig surfaces respectively abutted against the outer peripheral surfaces of the two lateral surface members forming the outer corner of the mold. The pressing jigs may be arranged in four areas of the outer corners of the mold only, so that the number of members can be reduced, leading to simplified work and reduced material costs. The outer peripheral surfaces of the two lateral surface members forming the outer corner can be fixed with an uniform force by the two jig surfaces of the pressing jig.

It is preferable that the pressing jig has a relief groove provided in an area corresponding to the outer corner of the mold such that the outer corner is not directly abutted thereagainst. The area corresponding to the outer corner is provided with the relief groove, so that the outer corner of the mold is prevented from being brought into contact with the pressing jig in attaching and detaching the pressing jig to and from the frame-shaped member. Even if attachment and detachment work is repeatedly performed, therefore, the outer corner can be prevented from being deformed and damaged, leading to reduction in the cost of the mold.

The frame-shaped member may have a projection abutted against the opposed lateral surface member for constraining displacement therebetween provided in its inner periphery. When the lateral surface member in the mold attempts to be deflected outward due to expansion caused by cooling and setting of the silicon melt, the displacement can be restrained by the projection.

It is preferable that when the engaging structure comprises engaging surfaces each comprising the projection of the one lateral surface member and the recess of the other lateral surface member engaged with and abutted against each other and being substantially level with the bottom surface of the bottom surface member, the frame-shaped members are respectively arranged at positions of the engaging surfaces. This can prevent the lateral surface member from being deflected even if stress is greatly applied to the lateral surface member as the frame-shaped member is fixed.

If the mold further comprises a mold release material applied to a mold inner surface comprising the bottom surface member and the lateral surface members, and four corners and eight ridges respectively serving as locking sections between the bottom surface member and the lateral surface members and locking sections between the lateral surface members, an inner wall of the mold and the silicon ingot are hardly welded after the silicon melt is solidified, so that the bottom surface member and the lateral surface members can be repeatedly used many times. Since the four corners and the eight ridges respectively serving as the locking sections are reliably sealed by the mold release material, the leakage of the silicon melt is reduced.

A method of forming a mold according to the present invention comprises a first step of applying a mold release material to respective surfaces of one bottom surface member and four lateral surface members, followed by drying; a second step of providing the four lateral surface members upright with the bottom surface member used as a bottom surface, and assembling the members in a box shape such that the surfaces to which the mold release material is applied positioned inside; and a third step of additionally applying the mold release material to locking sections comprising four corners and eight ridges that are formed by the bottom surface member and the lateral surface members. Each of the release members may be coated with the mold release material before the mold is assembled, and the mold release material may be only additionally applied only to the joining portion between the mold members after the mold members are assembled to the shape of the mold 1, so that work is dramatically simplified and working efficiency is significantly improved.

A polycrystalline silicon substrate producing method according to the present invention is a method of producing a silicon ingot using the mold according to the present invention that has been described and obtaining a polycrystalline silicon substrate from the silicon ingot. The polycrystalline silicon substrate produced by this method resists repetitive use, and is obtained from the silicon ingot produced using the mold whose assembly and disassembly work is significantly simple, so that lower costs can be expected.

BRIEF DESCRIPTION OF THE DRAWINGS

FIG. 13(a) is a perspective view of a mold according to the present invention in which a frame-shaped member is arranged at a position of an engaging surface 4a.

FIG. 13(b) is a perspective view of a mold according to the present invention in which a pressing jig is arranged at a position of an engaging surface 4a.

DESCRIPTION OF THE PREFERRED EMBODIMENTS

Embodiments of the present invention will be described in detail while referring to accompanying drawings.

Figure 1A:
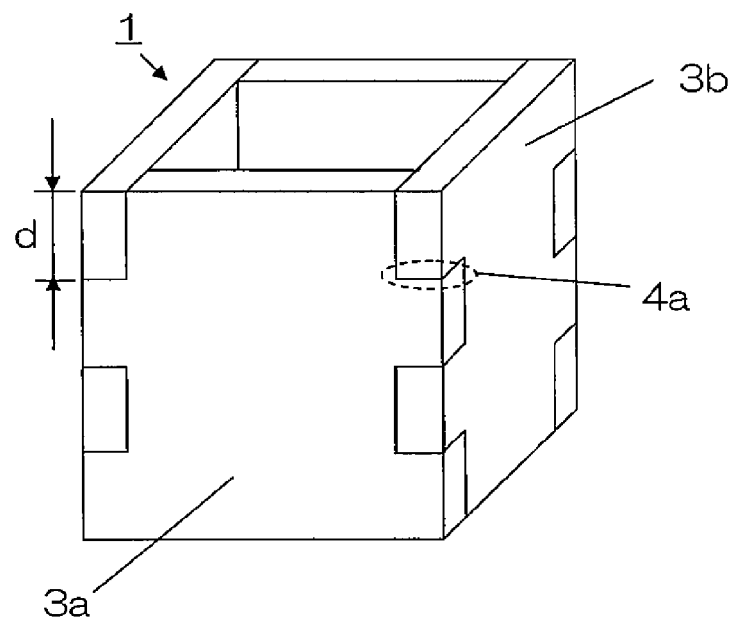
FIG. 1(a) is a perspective view showing an embodiment of a mold formed by combining a bottom surface member 2 and four lateral surface members 3 in the present invention.
Figure 1B:
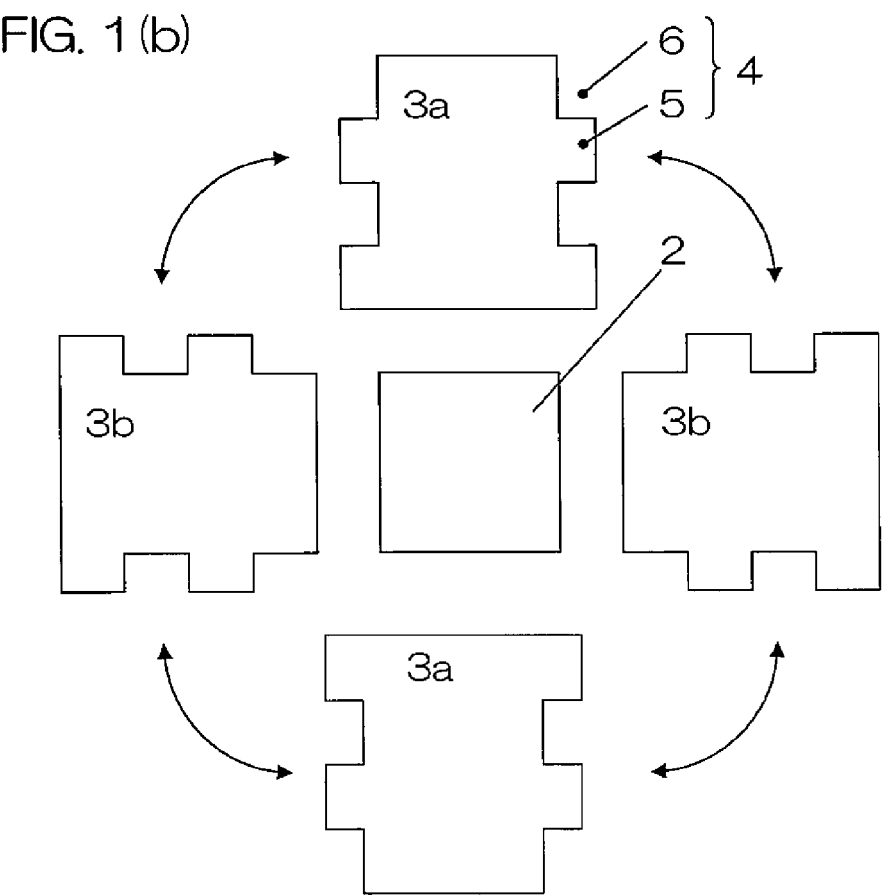
FIG. 1(b) is a developed view.

FIG. 1(a) is a perspective view showing a mold according to the present invention, and FIG. 1(b) is a developed view thereof.

In FIGS. 1(a) and 1(b), reference numeral 1 denotes a mold, reference numeral 2 denotes a bottom surface member, reference numeral 3 (3a, 3b) denotes a lateral surface member, reference numeral 4 denotes an engaging section, reference numeral 5 denotes a projection, and reference numeral 6 denotes a recess.

The mold 1 is a division mold that can be divided and assembled.

The mold 1 is composed of graphite, for example, and is a combination of one bottom surface member 2 composing the bottom of the mold and four lateral surface members 3 (3a and 3b) composing the sides of the mold 1.

As shown in FIGS. 1(a) and 1(b), the four lateral surface members 3 are provided so as to surround the outer periphery of the bottom surface member 2 provided at the bottom. Each of the lateral surface members 3 comprises an engaging section 4 for engaging the projection 5 and the recess 6 on the side of the lateral surface member 3 so as to couple the lateral surface members 3 to each other. The lateral surface members 3 are combined and provided upright by engaging the projection 5 of the one lateral surface member 3a into the recess 6 of the other lateral surface member 3b or engaging the recess 6 of the one lateral surface member 3a into the projection 5 of the other lateral surface member 3b, thereby forming the mold 1.

The above-mentioned mold 1 according to the present invention has a configuration using no screws, bolts, or the like for assembling and fixing the mold, unlike the conventional mold.

For example, the density of liquid silicon is higher than that of solid silicon, and silicon is a material that expands when it is solidified. Therefore, silicon experiences stress in the direction in which the bottom surface member 2 and the lateral surface members 3 in the mold 1 spread outward when a silicon melt is cooled and set within the mold 1.

The mold 1 according to the present invention does not have the problem that the fixing of a joining portion between the bottom surface member 2 and the lateral surface member 3 in the mold 1 or between the lateral surface members 3 is loosened by the fracture of a screw, a bolt, or the like and the wear of a thread, as compared with a configuration using screws, bolts, or the like, which can prevent the silicon melt that is being cooled and set within the mold 1 from leaking.

The problem that the thread is stripped, a mold member itself cannot be used, and the life of a high-cost graphite mold member is shortened is solved.

Assembly and disassembly work of the mold is more dramatically simplified, and working efficiency is more significantly improved, as compared with those in the conventional mold to which a large number of screws or bolts had to be attached for the purpose of fixing.

The mold 1 according to the present invention is so configured that out of engaging surfaces 4a that are surfaces where the projection of the lateral surface member 3 and the recess of the other lateral surface member 3 adjacent thereto are fitted into or engaged with and abutted against each other (refer to surfaces substantially level with the bottom surface of the bottom surface member 2 out of surfaces composing the engaging section 4), the distance d between the engaging surface closest to the upper side of the lateral surface member and the upper side is within a range of not less than 1 cm nor more than 8, as shown in FIG. 1. The distance d is preferably in a range of not less than 1 cm nor more than 4 cm.

This allows the lateral surface member 3 to be kept more substantially perpendicular to the bottom surface member 2.

The reason for this is that the lateral surface member 3a having the recess 6 is easily moved in a direction indicated by an arrow P both inward and outward because its upper part is not regulated by the other lateral surface member 3b in a joining portion between the projection 5 and the recess 6 respectively positioned at uppermost parts of the lateral surface members 3. The movement of the lateral surface member 3b is regulated by the adjacent lateral surface member 3a in a case where its upper part attempts to be curved inward, while there is nothing to be regulated in a case where the upper part attempts to be curved outward.

When the mold member is thin, therefore, the lateral surface member 3 may warp outward due to stress created by cooling and setting of the silicon melt. The lateral surface member 3 itself is opened by such warping of the lateral surface member 3, a side surface of a silicon ingot cast by the mold is also inclined, and an end material portion, which will not be a product, of the silicon ingot is enlarged so that an extra high-cost silicon raw material must be removed extra. Therefore, the production cost of the silicon ingot rises.

When the width d from the upper side of the lateral surface member 3 to the engaging surface 4a is as narrow as not less than 1 cm nor more than 8 cm and preferably not less than 1 cm nor more than 4 cm, therefore, warping of the upper part of the lateral surface member 3 caused by stress created by cooling and solidification of the silicon melt can be reduced.

This causes the lateral surface member 3 to be kept substantially perpendicular to the bottom surface member 2, so that removal of the end material portion of the ingot can be minimized. Therefore, the rise in the production cost of the silicon ingot can be restrained.

When the range d is made smaller than 1 cm, wear due to repetitive use particularly extends to the projection 5, so that the projection 5 is liable to be damaged. Therefore, the life of the mold member is shortened. When the range d is made larger than 8 cm, the upper part of the lateral surface member 3 warps, so that the lateral surface member 3 is not kept substantially perpendicular to the bottom surface member 2, and the end material portion, which will not be a product, is enlarged. Therefore, the production cost of the silicon ingot is increased.

Description is made of another engaging structure of the mold according to the present invention.

Figure 3A:
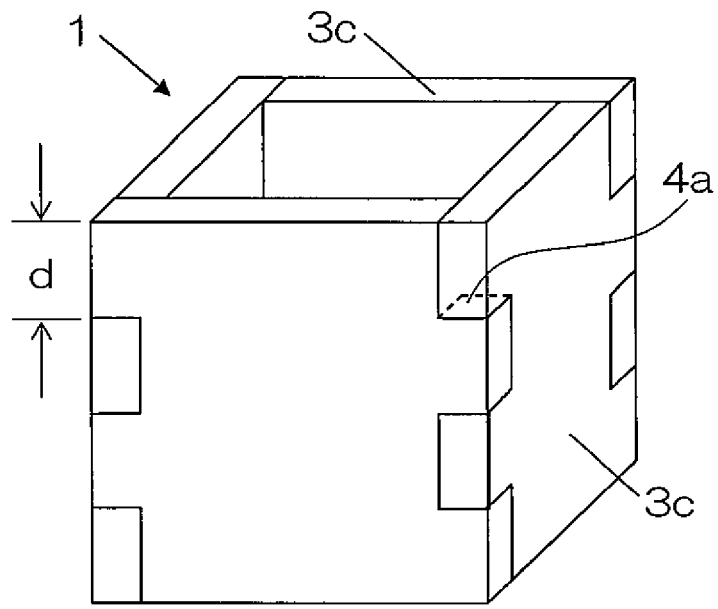
FIG. 3(a) is a perspective view showing another embodiment of a mold formed by combining a bottom surface member 2 and four lateral surface members 3 in the present invention.
Figure 3B:
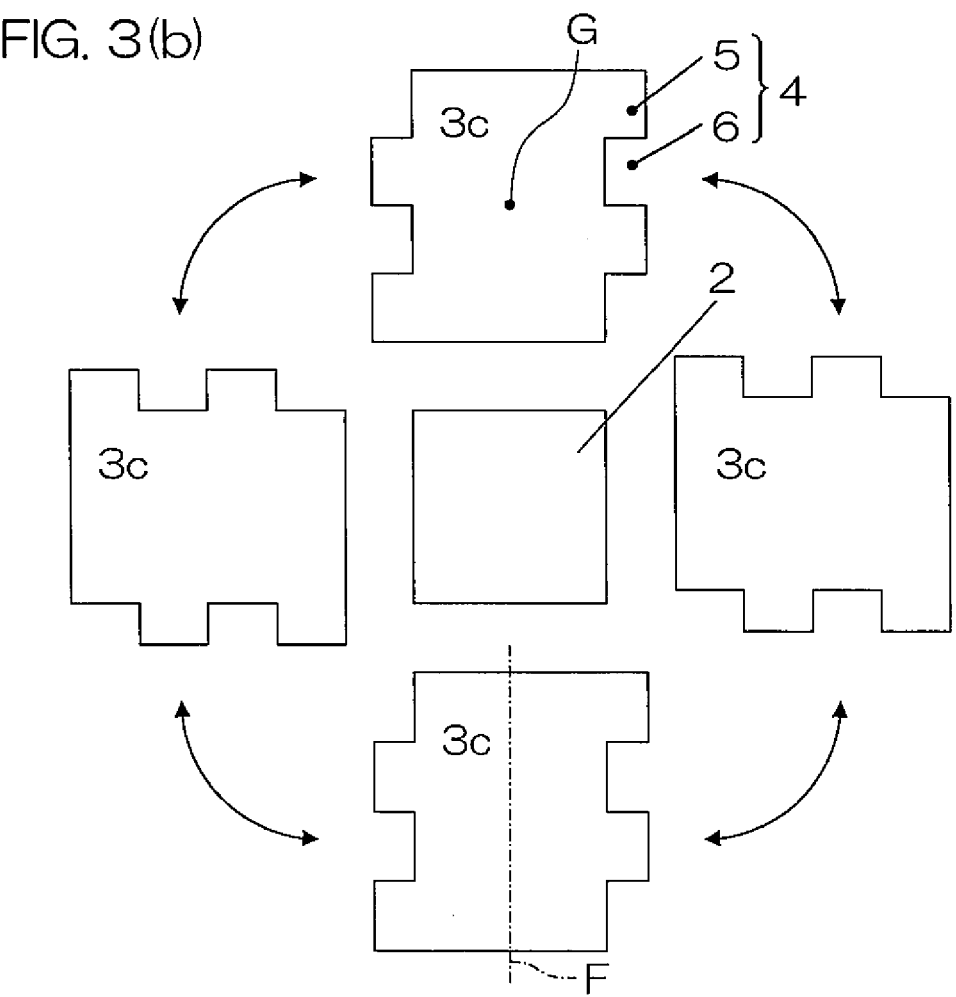
FIG. 3(b) is a developed view.

FIG. 3(a) is a perspective view showing a mold according to the present invention, and FIG. 3(b) is developed view thereof.

In the mold 1, a lateral surface member 3c is so adapted that the positions of a projection 5 and a recess 6 in an engaging section 4 that are respectively provided on the sides on both sides thereof are in an asymmetrical relationship with respect to a center line F of the lateral surface member 3c.

Furthermore, the number of projections 5 and the number of recesses 6 that are provided on the one side of the lateral surface member 3c are respectively even numbers (two each in the drawing).

In the mold 1 according to the present embodiment, when an attempt for the lateral surface member 3c to be curved inward is made, the movement thereof is regulated by the adjacent lateral surface member 3c.

The projection 5 and the recess 6 are thus respectively provided at both ends of the lateral surface member 3c so as to have an asymmetrical relationship so that the assembled mold 1 is firmly fixed with the effect of warping and deflection of the lateral surface member 3c alleviated.

It is desirable that the lateral surface member 3c in the mold 1 according to the present embodiment has the projection 5 and the recess 6 provided on the sides on both sides thereof so as to satisfy a point-symmetrical relationship with respect to a center point G of the lateral surface member 3c. Thus, whichever recess and projection are respectively selected and combined, they can be engaged with each other.

The projection 5 and the recess 6 thus have a point-symmetrical structure so that they have the same shape even if they are rotated through 180 degrees. Therefore, the concept on verticality of the lateral surface member 3c is eliminated.

The mold 1 has a mold heating means composed of a resistance heating heater, an induction heating coil, or the like provided in its upper part, a side wall of the mold 1 being covered with a mold insulating material composed of a graphite molded member or the like, and has a cooling means provided in its lower part. A silicon melt poured into the mold 1 is cooled from the bottom of the mold so that the silicon melt can be solidified in one direction upward from the bottom only by being heated from the top of the mold. Therefore, as the upper part of the mold is heated by the mold heating means, the mold member vigorously wears, so that the life of the mold is shortened. In the structure of the lateral surface member according to the present embodiment, however, the lateral surface member has the same shape even if it is rotated through 180 degrees. Therefore, the upper part and the lower part of the lateral surface member can be reversed. As a result, the life of the mold member can be lengthened.

Since all the shapes of the four lateral surface members 3c are the same, the mold is assembled only by the lateral surface members in one shape. Therefore, the production cost of a silicon ingot can be restrained.

Also in the present embodiment, when the distance d from the upper side of the lateral surface member 3 to the engaging surface 4a is made as narrow as not less than 1 cm nor more than 8 cm and preferably not less than 1 cm nor more than 4 cm, warping in the upper part of the lateral surface member 3c caused by stress created when the silicon melt is cooled and solidified can be reduced.

Description is now made of another embodiment of a mold according to the present invention.

Figure 4A:
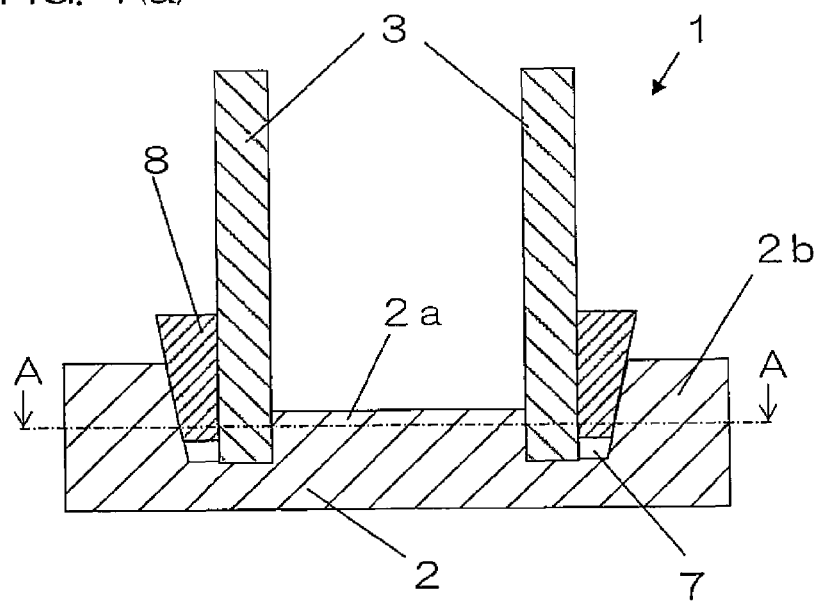
FIG. 4(a) is a cross-sectional view of a mold comprising a bottom surface member having a closed groove for dividing the mold into a square bottom surface center and a square bottom surface outer periphery.
Figure 4B:
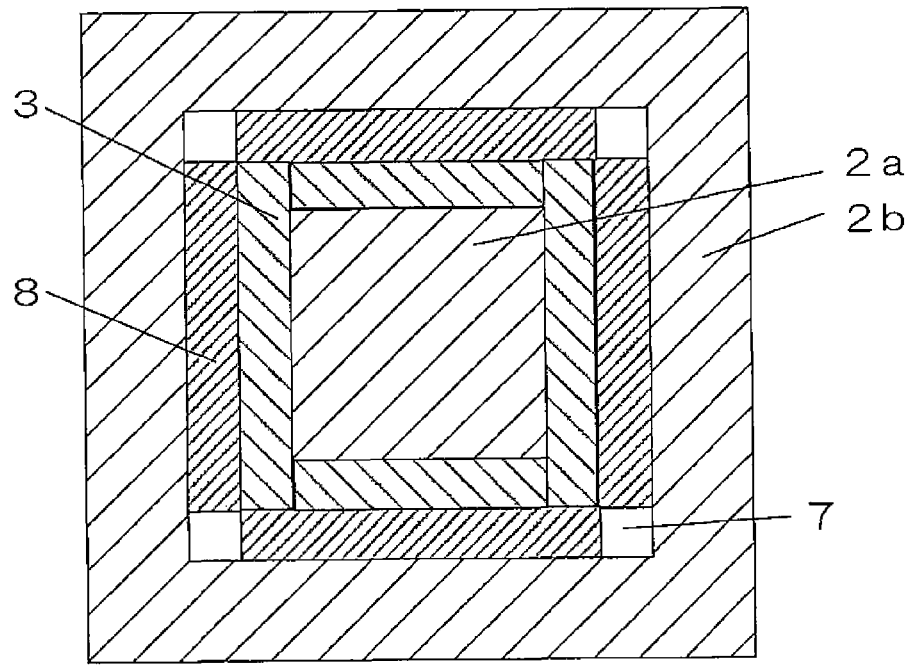
FIG. 4(b) is a cross-sectional view taken along a line A-A shown in FIG. 4(a).

FIG. 4(a) is a side sectional view showing a mold according to the present invention, and FIG. 4(b) is a cross-sectional view taken along a line A-A shown in FIG. 4(a).

Figure 2:
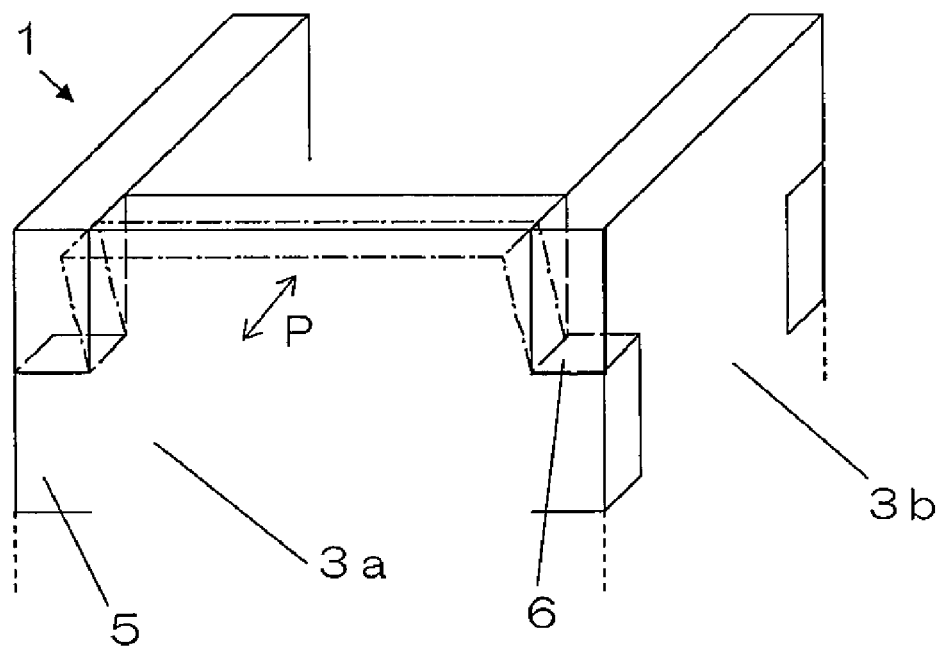
FIG. 2 is a diagram showing the state of warping of a lateral surface member.

A lateral surface member 3 in a mold 1 has an engaging structure described in FIGS. 1 to 3. A bottom surface member 2 in the mold 1 has a groove 7 for accepting the bottom side of the assembled lateral surface member 3 on its surface. The groove 7 is in a square shape as viewed from the top, and divides the bottom surface member 2 into a bottom surface center 2a and a bottom surface outer periphery 2b.

The bottom surface center 2a has its sides each corresponding to the bottom side of the lateral surface member 3 and serves as an inner bottom surface of the mold 1.

In a case where the bottom side of each of the lateral surface members 3 is engaged with the groove 7 and provided upright so as to surround the bottom surface center, wedges 8 are respectively arranged in clearances between outer peripheral surfaces of the four lateral surface members 3 and the bottom surface outer periphery 2b. In other words, the mold 1 is assembled by providing the bottom surface member 2 with the groove 7, placing the lateral surface member 3 in the groove 7, and driving the wedge 8.

Usable as the wedge 8 is a carbon fiber-reinforced carbon material (C/C material), for example.

When a silicon melt is held in the mold 1, stress due to the weight of the silicon melt is applied to the bottom of the mold 1. Particularly when the size of the mold is increased, the stress applied to the bottom of the mold is further increased. Therefore, a clearance is formed in a joining portion between the bottom surface member 2 and each of the lateral surface members 3, so that the silicon melt may leak out. In the configuration according to the present invention, however, the bottom surface member 2 and each of the lateral surface members 3 are firmly fixed to each other using the wedge 8 without loosening the joining portion between the bottom surface member 2 and each of the lateral surface member 3. Therefore, the leakage of the silicon melt is restrained, so that the size of the mold 1 can be increased.

Here, the shape of the wedge 8 and the number of wedges to be used are not particularly limited. For each of the lateral surface members 3, one long wedge 8 extending over the whole side surface of the lateral surface member 3 may be driven therein. Alternatively, a plurality of small wedges 8 may be attached to the lateral surface member 3.

The bottom surface center 2a serving as the inner bottom surface of the mold 1 and the bottom surface outer periphery 2b having a wedge receiving function need not have the same height. It is preferable that the bottom surface outer periphery 2b is made higher than the bottom surface center 2a, as shown in FIG. 4(a), for example, because the respective functions can be suitably performed.

Description is now made of another embodiment of a mold according to the present invention.

Figure 5A:
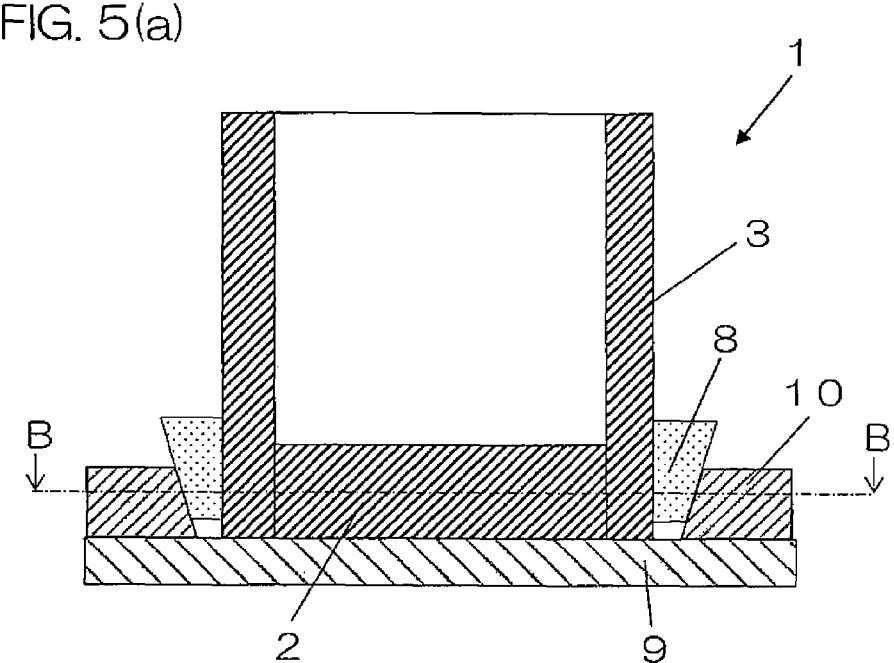
FIG. 5(a) is a cross-sectional view showing an embodiment of a mold according to the present invention, comprising a mold holder and wedge receivers.
Figure 5B:
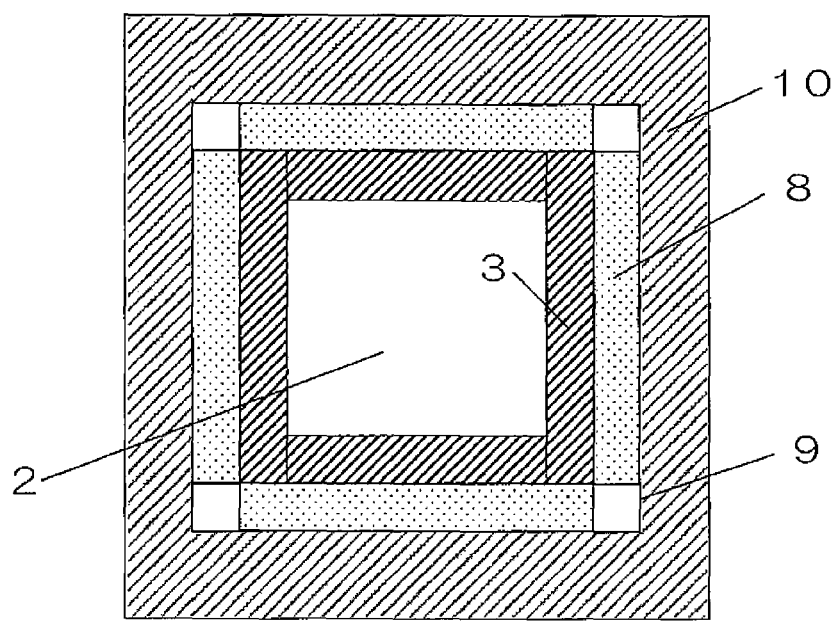
FIG. 5(b) is a cross-sectional view taken along a line B-B shown in FIG. 5(a).

FIG. 5(a) is a side sectional view showing another embodiment of a mold according to the present invention, and FIG. 5(b) is a cross-sectional view taken along a line B-B shown in FIG. 5(a).

A lateral surface member 3 in the mold 1 has the engaging structure described in FIGS. 1 to 3. In the mold according to the present embodiment, a bottom surface member 2 is in a substantially square shape as viewed from the top, whose sides respectively correspond to the bottom sides of four lateral surface members 3

The mold 1 further comprises a mold holder 9 for placing a bottom surface member 2, four lateral surface members 3 provided upright so as to surround the bottom surface member 2 on an upper surface of the mold holder 9, a plurality of wedge receivers 10 surrounding respective outer peripheral surfaces of the lateral surface members 3, and wedges 8 respectively arranged in clearances between the outer peripheral surfaces of the lateral surface members 3 and the plurality of wedge receivers 10. In other words, the mold 1 is assembled by placing the bottom surface member 2 on the mold holder 9 provided with the wedge receivers 10, arranging the four lateral surface members 3 so as to surround the outer periphery of the bottom surface member 2, and respectively driving the wedges 8 between the outer surfaces of the lateral surface members 3 and the wedge receivers 10.

The wedge receiver 10 and each of the lateral surface members 3 can be firmly fixed to each other without loosening a joining portion between the bottom surface member 2 and the lateral surface member 3 by driving the wedge 8 between the wedge receiver 10 and the lateral surface member 3. Therefore, the leakage of a silicon melt is restrained, so that the size of the mold 1 can be increased. The necessity of subjecting the bottom surface member 2 composed of a high-cost graphite mold member to special processing for preventing the leakage of the silicon melt is eliminated, so that the rise in the cost of the mold can be restrained.

Figure 6:
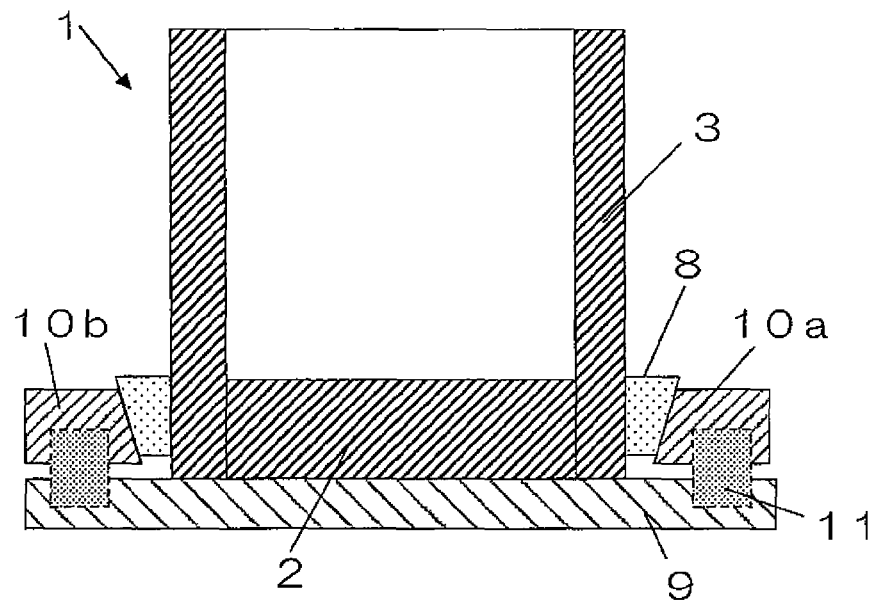
FIG. 6 is a cross-sectional view showing another embodiment of a mold according to the present invention.

The mold according to the present invention may be so configured that a plurality of wedge receivers 10 (10a, 10b) provided on a mold holder 9 are removable from an upper surface of the mold holder 9, as shown in FIG. 6. Even in a case where the wedge receiver 10 wears with repetitive use by removably attaching the wedge receiver 10 to the upper surface of the mold holder 9, only the wedge receiver 10 can be independently replaced, and the mold holder 9 need not be replaced and is continuously reusable. Therefore, the cost of the mold can be reduced.

At this time, an example of a method of fixing the wedge receiver 10 is a method of subjecting the mold holder 9 and the wedge receiver 10 to hole processing and engaging a wedge receiver fixing member 11 having such a diameter that it is just engaged with a hole to fix the wedge receiver 10, as shown in FIG. 6.

Figure 7:
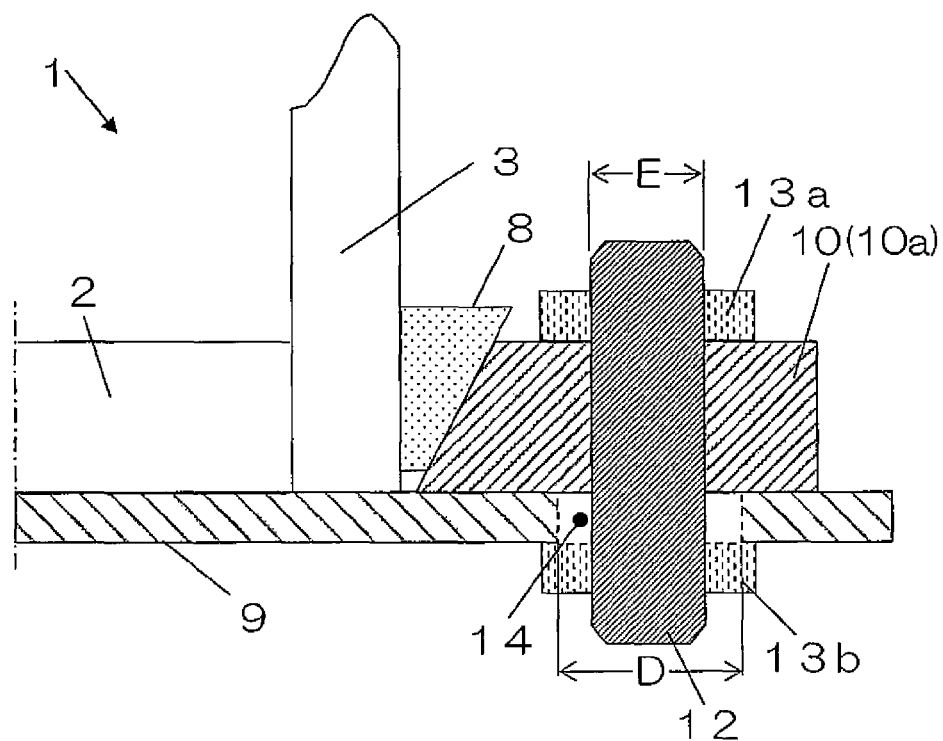
FIG. 7 is a partially enlarged sectional view of a wedge receiver in a mold according to the present invention.

Alternatively, four or more wedge receivers 10 arranged parallel to each of lateral surface members 3 in a mold 1 are fixed so as to be interposed using a wedge receiver fixing bolt 12 and upper and lower nuts 13a and 13b in one or a plurality of areas, as shown in an enlarged sectional view around a wedge shown in FIG. 7. The configuration as shown in FIG. 7 causes the wedge receiver 10 to be fixed to a mold holder 9 more reliably. As a result, a joining portion between a bottom surface member 2 and each of the lateral surface members 3 can be more firmly fixed to each other.

When the plurality of wedge receivers 10 are removable from an upper surface of the mold holder 9, as described above, it is desirable that a clearance between the wedge receiver 10a arbitrarily selected out of the plurality of wedge receivers 10 and the other wedge receiver 10b arranged at a position opposed thereto with the bottom surface member 2 sandwiched therebetween is adjustable on the upper surface of the mold holder 9.

Specifically, the inside dimension D of a wedge receiver fixing hole 14 provided in the mold holder 9 so as to attach the wedge receiver fixing bolt 12 may be made larger than the outside dimension E of the wedge receiver fixing bolt 12, as shown in FIG. 7. This allows the position of the wedge receiver 10 to be adjusted in a range determined from the inside dimension D and the outside dimension E. Therefore, a clearance between the opposed two wedge receivers can be adjusted.

Since the clearance between the wedge receivers 10a and 10b can be thus adjusted, the wedge receivers can be fixed without loosening the fixing of a mold member by adjusting the clearance between the opposed two wedge receivers 10a and 10b even when a joining portion between the bottom surface member 2 and each of the lateral surface members 3 or a surface where the wedge 8 and the wedge receiver 10 are brought into contact with each other wears, for example. It is desirable that the inside dimension D of the wedge receiver fixing hole 14 is increased within 5 mm which is larger than the outside dimension E of the wedge receiver fixing bolt 12. When the inside dimension D of the wedge receiver fixing hole 14 exceeds 5 mm rather than the outside dimension E of the wedge receiver fixing bolt 12, the adjustment width of the clearance between the opposed two wedge receivers 10a and 10b is increased by not less than an adjustment amount required to eliminate play produced by the wear of the member, which is not preferable because it becomes difficult to position of the wedge receivers 10a and 10b.

Description is now made of another configuration of the mold according to the present invention.

Figure 8A:
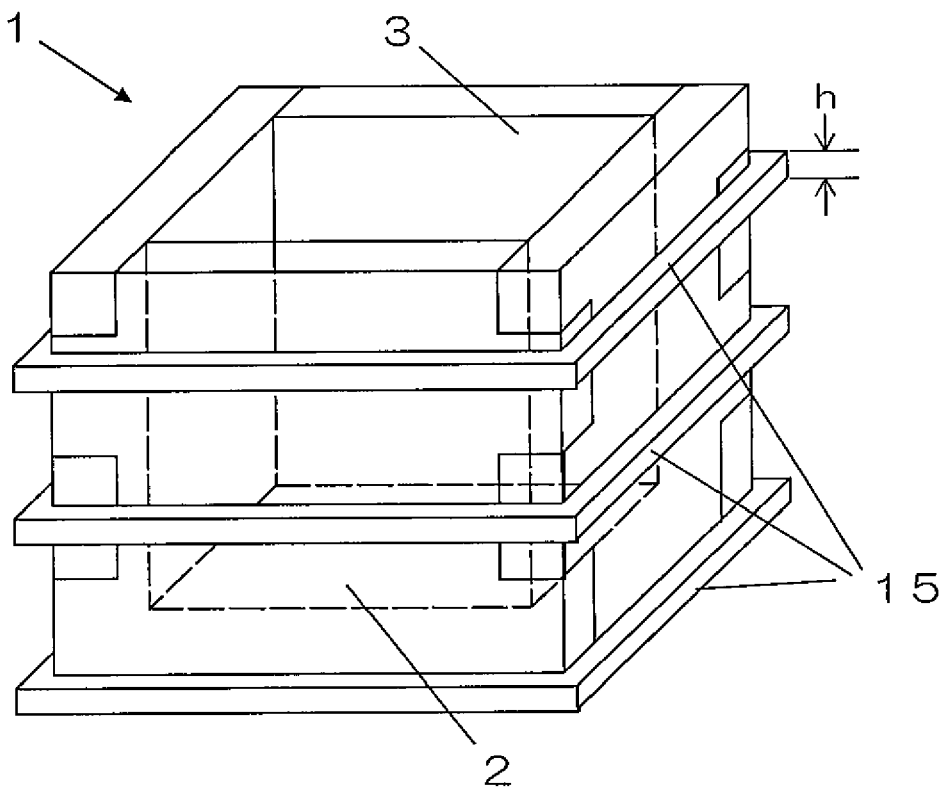
FIG. 8(a) is a perspective view of a mold according to the present invention comprising a frame-shaped member.
Figure 8B:
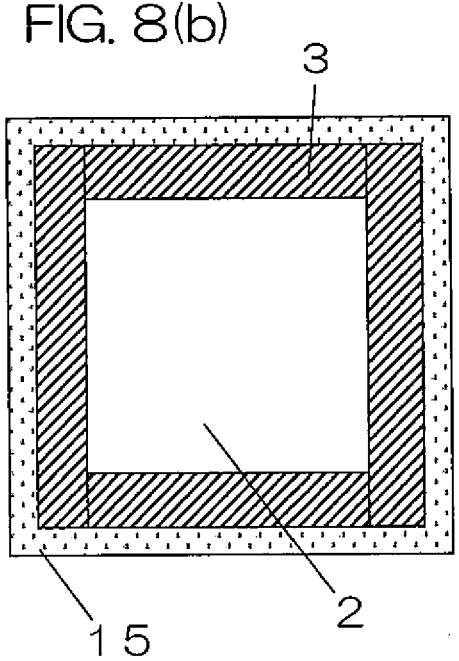
FIG. 8(b) is a cross-sectional view showing the shape of the frame-shaped member.
Figure 8C:
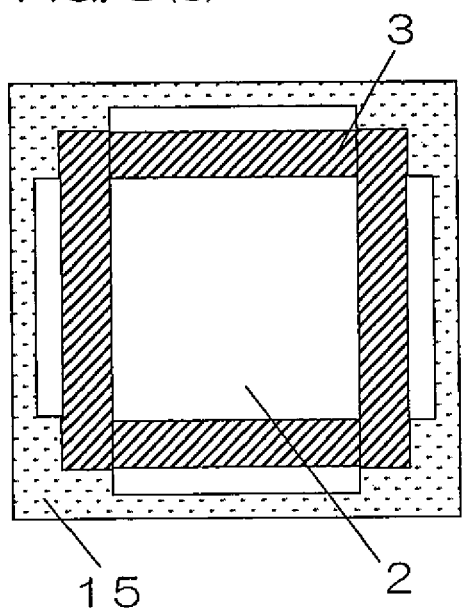
FIG. 8(c) is a cross-sectional view showing another shape of the frame-shaped member.

FIG. 8(a) is a perspective view showing a mold according to the present invention, and FIGS. 8(b) and 8(c) are plan views each showing still another embodiment.

The mold 1 comprises a frame-shaped member 15 arranged so as to surround the outer periphery of its side surfaces integrated by engaging adjacent lateral surface members 3 for constraining displacement therebetween.

By fixing the outer periphery of the side surfaces of the mold using the frame-shaped member 15, the engaging strength between the lateral surface members 3 is increased, and a joining portion between the bottom surface member 2 and each of the lateral surface members 3 is fixed, so that the mold can be increased in size and thinned. Since the use of the frame-shaped member 15 makes attachment and detachment to and from the mold 1 easy, and allows assembly and disassembly work of the mold 1 to be smoothly performed.

The frame-shaped member 15 may be in such a shape that the whole periphery of the lateral surface member 3 is fixed, as shown in FIG. 8(b), or in such a shape that only the corners of the mold are fixed, as shown in FIG. 8(c).

It is desirable that the frame-shaped member 15 is composed of a carbon fiber-reinforced carbon material (C/C material) being lightweight and high in strength, for example, as in the foregoing. If the thickness h thereof is set to 3 to 10 mm, handling is easy and sufficient strength is obtained.

The lateral surface member 3 in the mold 1 easily spreads toward its upper end due to expansion caused by cooling and setting of a silicon melt. Particularly when the mold 1 is increased in size and thinned, the effect thereof is great. Therefore, it is preferable that the frame-shaped member 15 is provided within 4 cm from the upper end of the mold 1.

Furthermore, if fixing of the bottom surface member 2 and each of the lateral surface members 3 by the wedge 8 driven into the bottom of the mold shown in FIGS. 4 to 7, described above, and fastening of the lateral surface members 3 by the frame-shaped member 15 are simultaneously performed, a joining portion between the members is firmly fixed, which is preferable because the mold 1 can be further increased in size and thinned.

Although in the above-mentioned mold, the lateral surface members 3 are directly pressed by the frame-shaped member 15, a mold, described below, has a configuration in which play is given between the mold 1 and a frame-shaped member 15, and a pressing jig 16 is arranged in a clearance therebetween, to constrain displacement between lateral surface members 3.

Figure 9A:
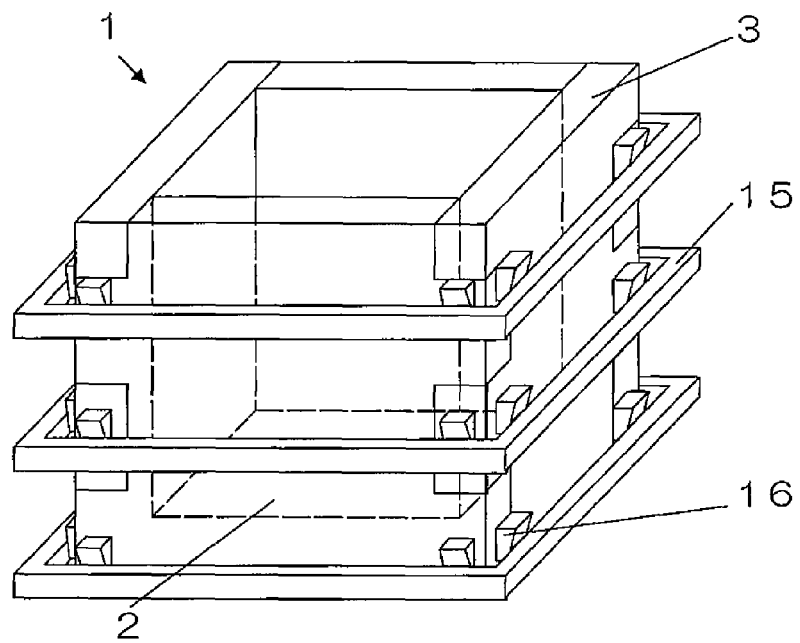
FIG. 9(a) is a perspective view showing a state where pressing jigs are respectively arranged in clearances between a frame-shaped member and four outer corners formed by the adjacent lateral surface members.
Figure 9B:
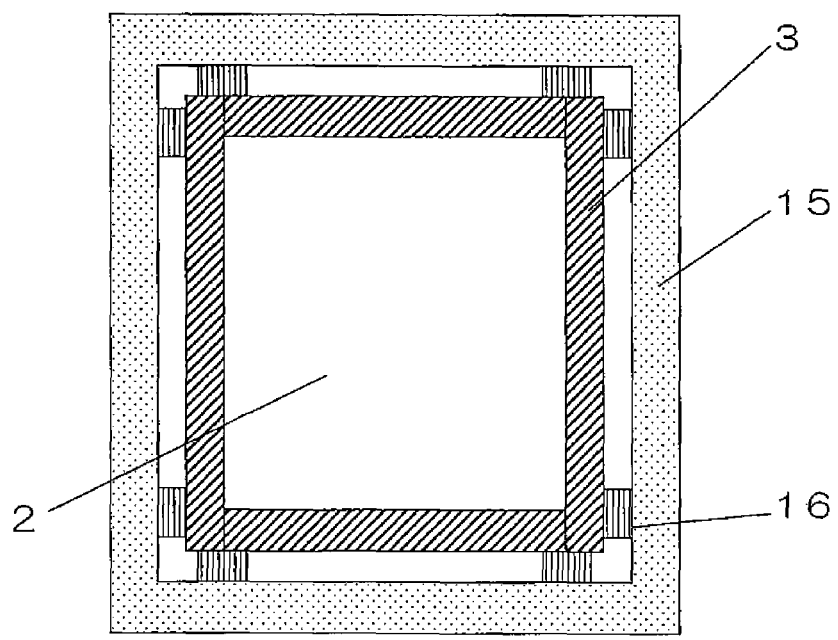
FIG. 9(b) is a cross-sectional view thereof.
Figure 11A:
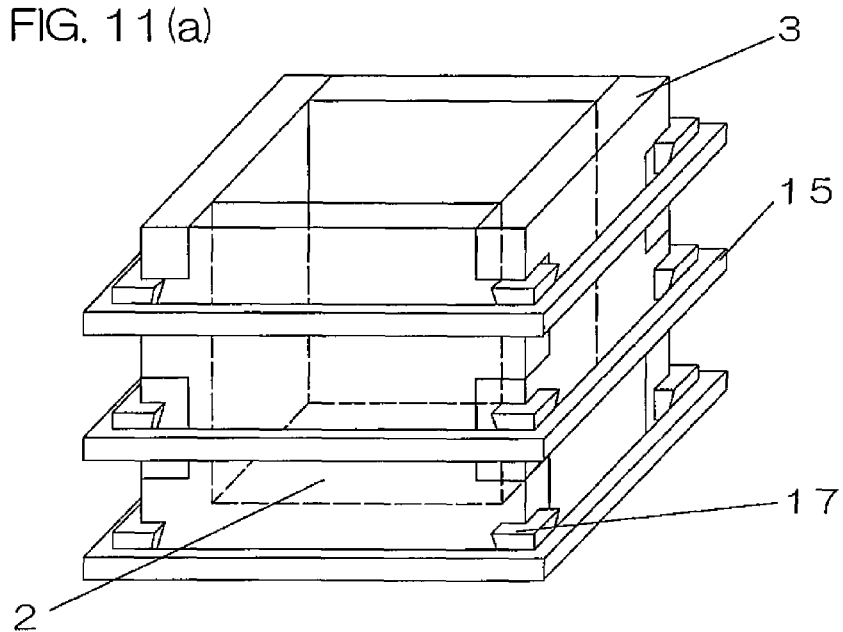
FIG. 11(a) is a perspective view of a mold according to the present invention comprising a frame-shaped member and pressing jigs.
Figure 11B:
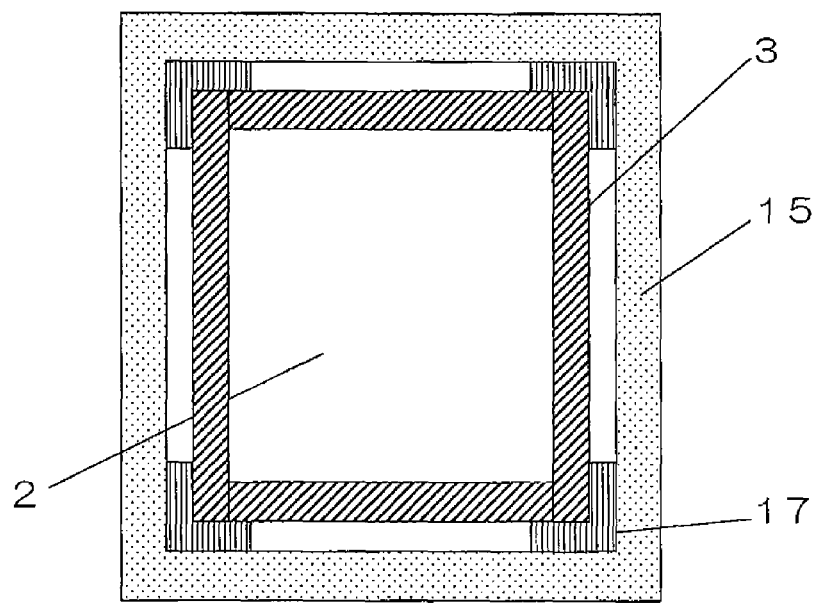
FIG. 11(b) is a cross-sectional view thereof.
Figure 12A:
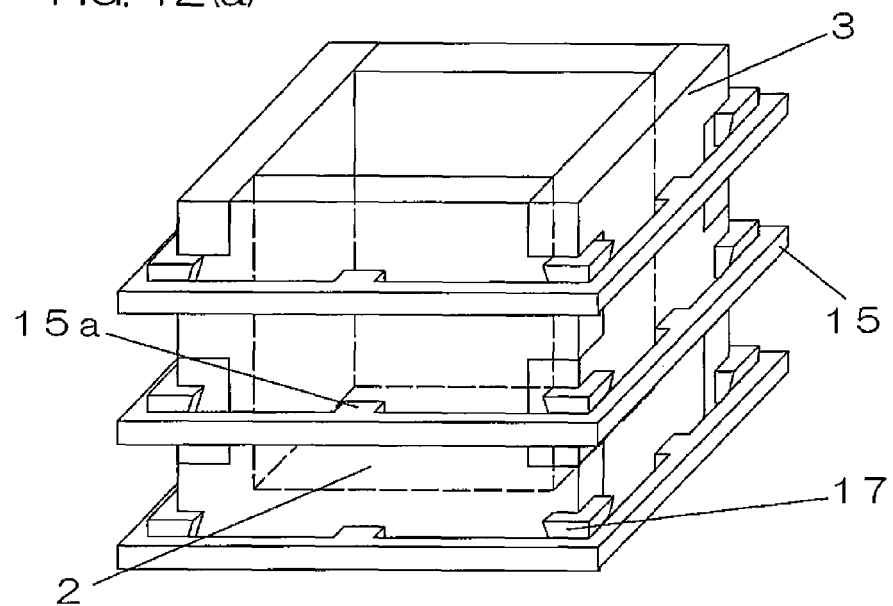
FIG. 12(a) is a perspective view of a mold according to the present invention comprising a frame-shaped member having projections.
Figure 12B:
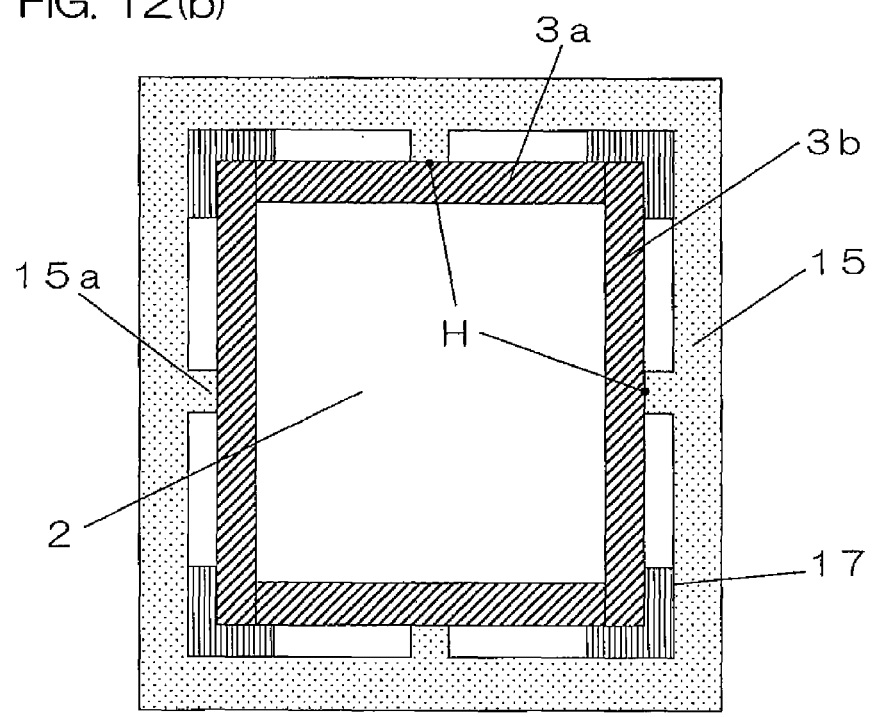
FIG. 12(b) is a plan view thereof.

FIGS. 9, 11, and 12 are diagrams showing a mold having this configuration, where FIG. 9(*a*) is a perspective view showing the configuration of the mold, and FIG. 9(*b*) is a plan view thereof. FIG. 11(*a*) is a perspective view showing a mold having another configuration, and FIG. 11(*b*) is a plan view thereof. FIG. 12(*a*) is a perspective view showing a mold having still another configuration, and FIG. 12(*b*) is a plan view thereof.

Figure 10A:
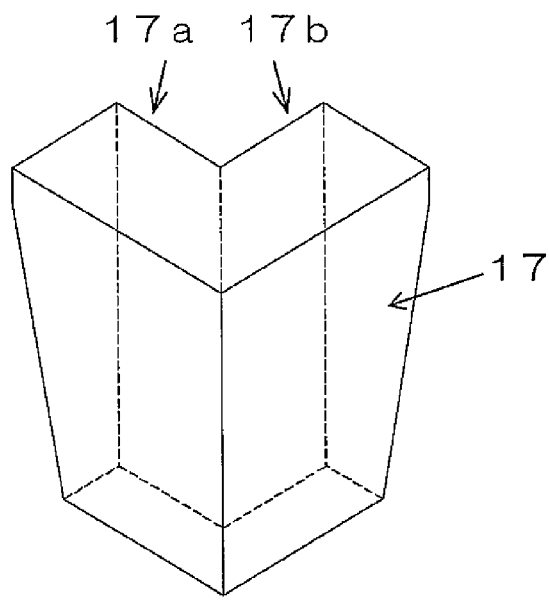
FIGS. 10(a) to 10(c) are diagrams showing the shape of a pressing jig in a mold according to the present invention.
Figure 10B:
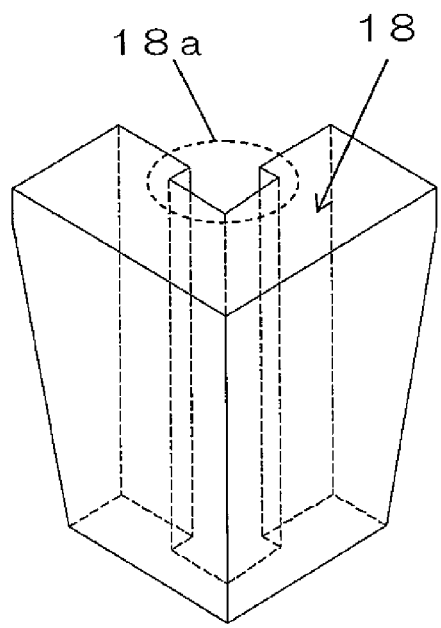
Figure 10C:
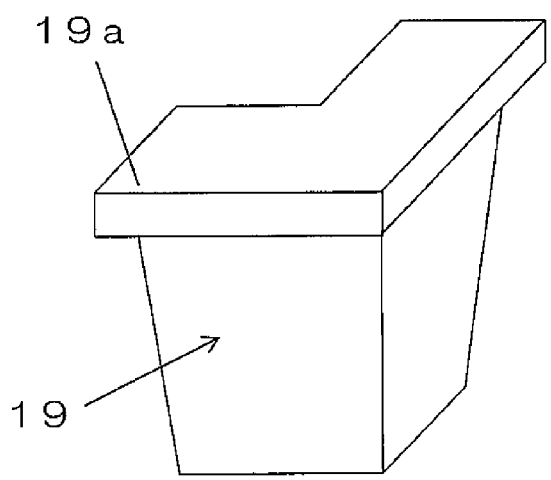

FIGS. 10(*a*) to 10(*c*) are perspective views showing an example of a pressing jig in the mold according to the present invention shown in FIGS. 11(*a*) and 11(*b*).

The mold 1 shown in FIG. 9 comprises a frame-shaped member 15 arranged with play given between the frame-shaped member and the mold 1 so as to surround the outer periphery of four lateral surface members 3 integrated by engaging the adjacent lateral surface members 3. A pressing jig 16 is arranged in a clearance between an outer corner formed by the adjacent lateral surface members 3 in the mold 1 and the frame-shaped member 15, to constrain displacement between the lateral surface members 3.

In the example shown in FIG. 9, two pressing jigs 16 are provided in four areas at each of the outer corners per one frame-shaped member 15. The two lateral surface members 3 forming the corner of the mold 1 are respectively pressed by the two pressing jigs 16.

The frame-shaped member 15 is thus arranged with play between the frame-shaped member and the lateral surface member 3 in the mold 1, so that attachment to the mold 1 is easy, and the mold 1 and the frame-shaped member 15 are reliably fixed to each other by the pressing jigs 16. Even when the lateral surface member 3 is thinned, therefore, the mold 1 can be prevented from spreading outward due to expansion caused by cooling and setting of a silicon melt.

The frame-shaped member 15 can be easily removed from the mold 1 by removing the pressing jigs 16. Therefore, assembly and disassembly work of the mold 1 can be more smoothly performed, as compared with assembly and disassembly work of the conventional mold to which a large number of screws or bolts must be attached for the purpose of fixing.

When stress is applied to the center of each of the lateral surface members 3 for the purpose of fixing, the lateral surface member 3 is deflected inward. When a silicon ingot is formed, therefore, an end material portion, which will not be a product, of the silicon ingot is enlarged, so that an extra high-cost silicon raw material must be removed, which is not preferable because the production cost of the silicon ingot rises. However, a total of eight pressing jigs 16 (two pressing jigs per one corner of the mold 1) are arranged and fixed, as shown in FIG. 9, so that stress created by fixing of the frame-shaped member 15 is applied to an end of the lateral surface member 3 and particularly, an engaging section 4. Thus, stress applied to the center of each of the lateral surface members 3 is alleviated while reliably fixing the lateral surface member 3, so that inward deflection of the lateral surface member 3 can be restrained.

It is desirable that the pressing jig 16 is in a wedge shape. The thinner pressing jig is inserted into a clearance between the mold 1 and the frame-shaped member 15 and is driven and fixed, so that each of the lateral surface members 3 in the mold 1 can be held more reliably. Further, the fixing strength of the frame-shaped member 15 can be also adjusted by adjusting the driving strength of the pressing jig 16.

Furthermore, the pressing jig is formed from one member or formed by integrally assembling a plurality of members, as shown in FIGS. 10(*a*) to 10(*c*). The pressing jig may have two jig surfaces respectively abutted against the outer peripheral surfaces of the two lateral surface members 3 forming the outer corner of the mold 1.

A pressing jig 17 shown in FIG. 10(*a*) is an integral-type jig comprising two jig surfaces 17*a* and 17*b*. The pressing jig 17 is arranged at each of outer corners in four areas on side surfaces of the mold 1 and is so configured that the jig surfaces 17*a* and 17*b* are respectively abutted against the outer peripheral surfaces of the two lateral surface members 3 forming the corner. Consequently, the corner between the side surfaces of the mold 1 is held by the one pressing jig 17, so that two surfaces of the lateral surface members 3 forming the corner can be pressed with a more uniform force. The possibility that only one of the two pressing jigs is deeply filled in the mold 1 so that an unreasonable force is applied to the mold 1 in the case shown in FIG. 9 is eliminated. As a result, the mold 1 is prevented from being deformed and damaged, which can prevent the life of a mold member from being shortened. Further, the number of pressing jigs 17 required is four. Therefore, the number of components can be reduced, as compared with that in the case shown in FIG. 9, so that fixing and disassembly work can be simplified and material costs can be reduced.

As shown in FIG. 10(*b*), it is desirable that a pressing jig 18 has a relief groove 18*a* provided in an area corresponding to an outer corner of the mold 1 such that the outer corner is not directly abutted against the pressing jig 18. This can prevent the corner between the side surfaces of the mold 1 from being brought into direct contact with the pressing jig 18 in attaching and detaching the pressing jig 18 to and from the frame-shaped member 15. Even if attachment and detachment work is repeatedly performed, therefore, the corner between the side surfaces of the mold 1 that is easy to damage can be prevented from being deformed and damaged, leading to reduction in the cost of the mold 1.

As shown in FIG. 10(*c*), there may be provided a wide portion 19*a* that is wide in an upper part of an integral-type pressing jig 19. By providing such a wide portion 19*a*, the wide portion 19*a* can be directly pressed in a case where the pressing jig 19 is inserted into a clearance between the mold 1 and a frame-shaped member 7. In a case where the pressing jig 19 is firmly pressed, the wide portion 19*a* may be tapped. Further, the pressing jig 19 has such an effect that it can be pulled out with the wide portion 19*a* held when it is removed, resulting in further improved workability.

As shown in FIGS. 12(*a*) and 12(*b*), the inner periphery of a frame-shaped member 15 may be provided with projections 15*a*, directed toward opposed four lateral surface members 3 in the mold 1. Although the lateral surface member 3 in the mold 1 is deflected outward due to expansion caused by cooling and setting of a silicon melt, when a member of the mold 1 is thinned, the effect thereof is increased. If the frame-shaped member 15 is provided with the projection 15*a*, an outer peripheral surface of the lateral surface member 3 is abutted against the projection 15*a*, and the movement thereof is regulated, so that outward deflection of the lateral surface member 3 can be restrained.

The projection amount of the projection 15*a* may be also the same as the width of a clearance between the mold 1 and the frame-shaped member 15, as also shown in a plan view of FIG. 12(*b*). It is desirable that the projection 15*a* presses a substantially central portion on an outer peripheral surface of the lateral surface member 3. The reason for this is that the displacement particularly at the center H of the lateral surface member 3 becomes significant due to expansion caused by cooling and setting of the silicon melt.

Although in the above-mentioned embodiment, description was made of an example in which the projection 15*a* provided in the frame-shaped member 15 is brought into contact with one of the lateral surface members 3 in one area, the present invention is not limited to the same. For example, projections 15*a* may be respectively provided in a plurality of (two or three or more) frame-shaped members 15 and brought into contact with one of the lateral surface members 3 in a plurality of areas. In a case where there are two frame-shaped members 15, it is desirable that a straight line formed by connecting projections 15*a* respectively provided in the upper and lower frame-shaped members 15 passes through the center H. In a case where there are three or more frame-shaped members 15, it is desirable that the center H is included inside a figure formed by connecting projections 15*a* respectively provided in the three frame-shaped members 15. The reason for this is that the displacement at the center H can be effectively restrained by each of the projections 15*a*.

Furthermore, the projection 15*a* in the one frame-shaped member 15 may be brought into contact with the one lateral surface member 3 in two or more areas.

It is desirable that the pressing jigs 16 to 19 are composed of a carbon fiber-reinforced carbon material (C/C material) or the like being lightweight and high in strength. It is desirable that a surface, in contact with the outer peripheral surface of the lateral surface member 3 in the mold 1, of each of the pressing jigs 16 to 19 is a plane, and a surface, in contact with the frame-shaped member 15, of the pressing jig is in a wedge shape having a predetermined slope.

The lateral surface member 3 in the mold 1 more easily spreads toward its upper end in the configuration according to the present invention due to expansion caused by cooling and setting of the silicon melt. Particularly when the mold 1 is increased in size and thinned, the effect thereof is large. Therefore, it is preferable that the frame-shaped member 15 is provided within 4 cm from the upper end of the mold 1.

Furthermore, fixing of the bottom surface member 2 and each of the lateral surface members 3 by the wedge 8 driven into the bottom of the mold shown in FIGS. 4 to 7, described above, and fastening of the lateral surface members 3 by the frame-shaped member 15 are simultaneously performed, so that each of joining portions between the members is firmly fixed, which is preferable because the mold 1 can be further increased in size and thinned.

Figure 13A:
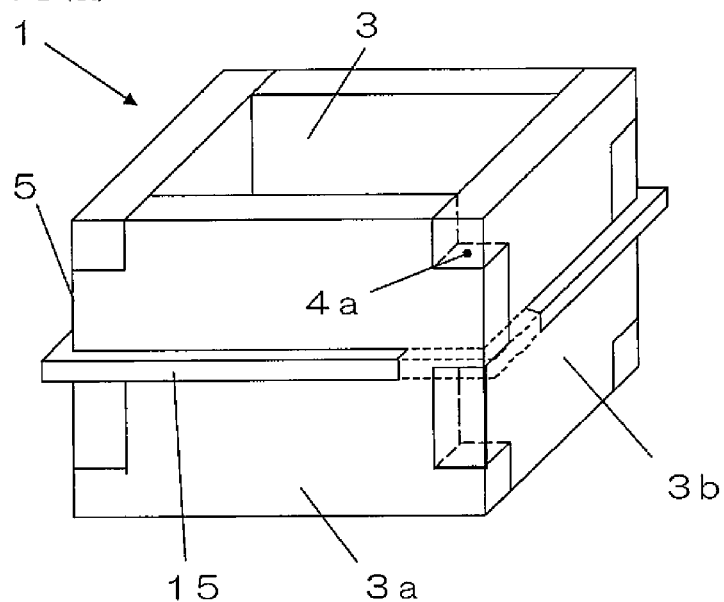
Figure 13B:
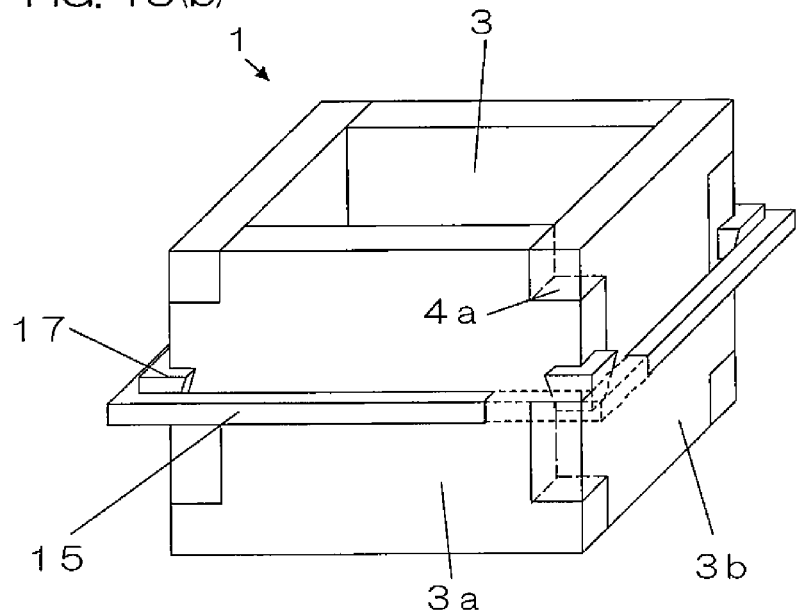

In a case where the frame-shaped member 15 is used, it is desirable that the frame-shaped member 15 is arranged at a position of an engaging surface 4*a* serving as a surface where a projection of the lateral surface member 3 and a recess of the adjacent lateral surface member 3, which are engaged with each other, are abutted against each other, as shown in FIGS. 13(*a*) and 13(*b*). The engaging surface 4*a* refers to a surface, which is substantially level with a bottom surface of the bottom surface member 2, out of surfaces composing the engaging section 4. Even if stress is greatly applied to the lateral surface member 3 as the frame-shaped member 15 is fixed, therefore, the lateral surface member 3 can be prevented from being deflected.

Description is now made of a method of using the mold 1 according to the above-mentioned embodiment of the present invention.

In employing the mold 1, it is desirable that a mold inner surface comprising a bottom surface member 2 and lateral surface members 3 and locking sections comprising four corners and eight ridges are provided with a mold release material.

The mold release material can be formed by mixing powder of silicon nitride ($Si_3N_4$) with a PVA (polyvinyl alcohol) solution and applying a mixture obtained to an inner surface of the mold 1, for example. Silicon nitride in the form of powder is changed into a slurry form by being mixed with the PVA solution or the like, so that it is easily applied to the mold 1. Used as the powder of silicon nitride is one having an average particle diameter of approximately 0.4 to 0.6 µm. Such silicon nitride is changed into a slurry form by being mixed in a polyvinyl alcohol solution having a concentration of approximately 5 to 15% by weight, and is applied using a paddle, a brush, a dispenser, or the like. A mixture of powder of silicon nitride and powder of silicon dioxide may be applied.

By providing such a mold release material, an inner wall of the mold 1 and a silicon ingot are hardly welded after a silicon melt is solidified, so that the mold can be employed repeatedly many times. A locking section between the bottom surface member 2 and each of the lateral surface member 3 is more reliably sealed with the mold release material additionally applied in the third process, described below, so that leakage of the silicon melt is reduced.

It is desirable that a specific method of forming a mold release material is carried out through three processes, next described. As the first process, a mold release material in the form of a slurry obtained in the above-mentioned way is applied to surfaces of the bottom surface member 2 and the four lateral surface members 3, followed by drying. As the second process, the four lateral surface members 3 are provided upright with the bottom surface member 2 used as a bottom surface, and are assembled in a box shape such that a surface coated with the mold release material positioned inside. As the third process, the mold release material is additionally applied by a dispenser, for example, to locking sections, comprising four corners and eight ridges, which are formed by the bottom surface member 2 and the lateral surface members 3.

If the mold release material forming method is carried out through the three processes, each of the mold members may be coated with the mold release material before the mold 1 is assembled, and the mold release material may be only additionally applied to a joining portion between the mold members, so that work is dramatically simplified and working efficiency is significantly improved.

In such a way, the mold according to the present invention can be realized.

In the conventional example, a material for the mold member has been limited to one capable of carrying out an additional process for attaching screws, bolts, or the like to a mold member. For example, a graphite material has been used. In the present invention, however, the above-mentioned complicated processing need not be performed, and the structure of the mold member can be significantly simplified. Therefore, the mold member is not limited to the graphite material. For example, various types of refractories such as molten silica, silicon nitride, and silicon carbide can be used.

The embodiment of the present invention is not limited to only the above-mentioned example. It goes without saying that various changes can be made without departing from the scope of the present invention.

Although description was made of an example in which the silicon melt is held to solidify polycrystalline silicon, the present invention is not limited to the same. The same effect can be produced even if other materials are used. For example, a monocrystalline silicon ingot may be grown from the silicon melt using monocrystalline silicon held in a predetermined direction at the bottom of the mold as a seed. The material is not limited to a semiconductor nonmetal material. For example, a metal material may be used, provided that it is cast by a casting method.

A material mainly composed of carbon, for example, a graphite felt and particularly, a mold insulating material (not shown) having its surface subjected to coating processing using carbon powder, or the like may be arranged on the outer periphery of the mold 1. The member may be interposed between the wedge 8 and the wedge receiver 10 or between the wedge 8 and the lateral surface member 3. Alternatively, the member may be interposed between the frame-shaped member 15 and the lateral surface member 3. Such a mold insulating material is for insulating a side surface of the mold 1 to solidify the mold 1 in one direction in a casting method for obtaining a polycrystalline silicon ingot, as described later.

Description is then made of a method of casting a silicon ingot using a casting method and a method of producing a polycrystalline silicon substrate for obtaining a polycrystalline silicon substrate from the silicon ingot.

The polycrystalline silicon substrate is generally produced by a method referred to as a casting method. The casting method is a method of cooling and setting a silicon melt within a mold coated with a mold release material to form a polycrystalline silicon ingot. An end of the silicon ingot is removed, the remaining silicon ingot is cut down to desired dimensions, and the cut ingot is sliced to a desired thickness, to obtain a polycrystalline silicon substrate for forming a solar cell.

Figure 14:
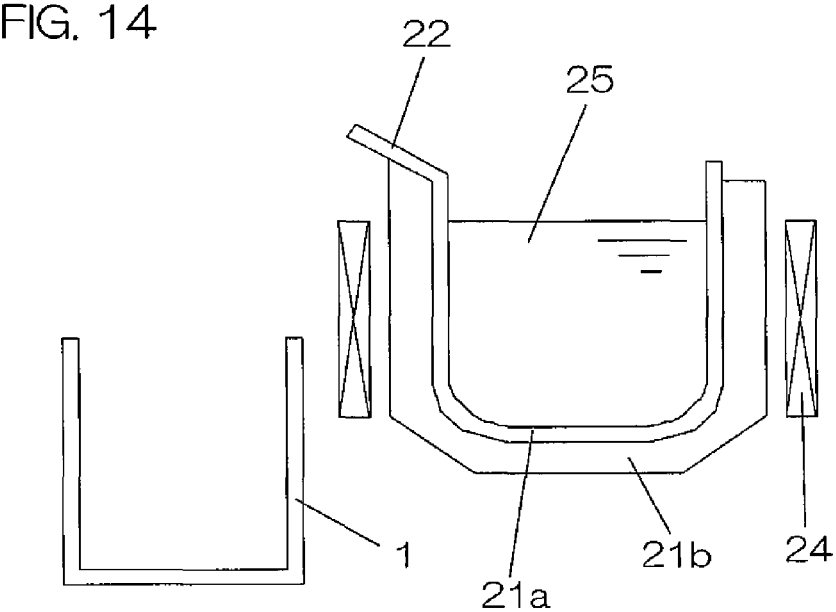
FIG. 14 is an illustration showing a silicon casting device.

In order to carry out the casting method, a silicon casting device shown in FIG. 14, for example, is used. In FIG. 14, reference numeral 21a denotes a melting crucible, reference numeral 21b denotes a holding crucible, reference numeral 22 denotes a pouring port, reference numeral 1 denotes a mold according to the present invention, reference numeral 24 denotes heating means, and reference numeral 25 denotes a silicon melt.

The melting crucible 21a for melting a silicon raw material is held in the holding crucible 21b and arranged therein, and the porting port 22 for pouring the silicon melt by inclining the melting crucible 21a is provided at an upper edge of the melting crucible 21a. The heating means 24 is arranged around the melting crucible 21a and the holding crucible 21b, and the mold 1 into which the silicon melt is poured is arranged below the melting crucible 21a and the holding crucible 21b. The melting crucible 21a uses high-purity quartz, for example, in consideration of a heat resistance performance, the fact that impurities are not diffused into the silicon melt, and so on. The holding crucible 21b is for holding the melting crucible 21a composed of quartz or the like because the melting crucible 21a is softened at high temperatures in the vicinity of a melting point of silicon so that the shape thereof cannot be maintained. Used as a material for the holding crucible 21b is graphite or the like. Examples of the heating means 24 include a resistance heating heater and an induction heating coil.

The mold 1 arranged below the melting crucible 21a and the holding crucible 21b is used with a mold release material (not shown), described above, applied to its inner part. A mold insulating material (not shown) for restraining heat removal is placed around the mold 1. A carbon material is generally used for the mold insulating material in consideration of heat resisting properties, heat insulating properties, or the like. A cooling plate (not shown) for cooling and setting the poured silicon melt may, in some cases, be placed below the mold 1. These are all arranged within a closed chamber (not shown).

A method of producing a silicon ingot using the silicon casting device shown in FIG. 14 is as follows. First, a silicon raw material is put into the melting crucible 21a, and the silicon raw material within the melting crucible 21a is dissolved by the heating means 24. After the silicon raw material is completely changed into a melt 25, the melting crucible 21a is inclined to pour the silicon melt into the mold placed below the melting crucible 21a from the pouring port 22 at the upper edge of the melting crucible 21a. After the silicon melt is poured, silicon within the mold is cooled from the bottom and is solidified in one direction, is then slowly cooled while controlling the temperature thereof to a temperature at which it can be taken out of a furnace, and is finally taken out of the furnace to complete the casting.

The method is a method referred to as a pouring method for completely dissolving a silicon raw material serving as a melt in the mold 1 and pouring the melt, cooling silicon within the mold from the bottom after the melt is poured to solidify the silicon in one direction. In addition thereto, an in-mold melting method for putting a silicon raw material into the mold 1, dissolving the silicon raw material in the mold 1, and cooling the dissolved silicon from the bottom to solidify the silicon may be employed. In the in-mold melting method, it is feasible to dissolve a material uniformly within the mold 1 to form a melt, then pass a cooling medium (water, refrigeration medium gas, etc.) through a base of the mold, to remove heat from the bottom of the mold 1, and solidify the melt in one direction from the bottom of the mold 1.

Figure 15:
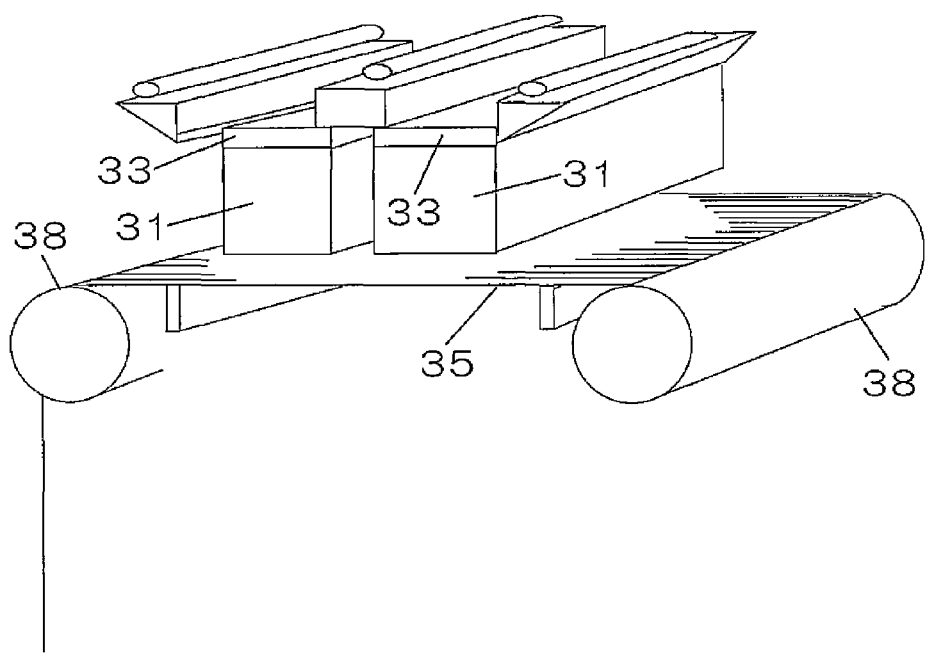
FIG. 15 is a perspective view for explaining a method of slicing an ingot using a wire saw.
Figure 16:
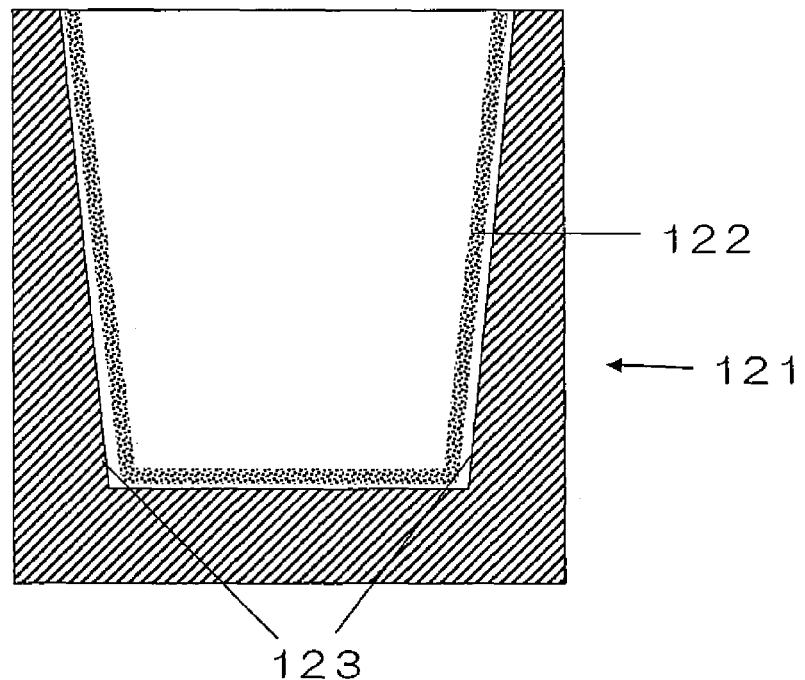
FIG. 16 is a cross-sectional view showing a conventional mold.

FIG. 15 is a perspective view for explaining a method of slicing an ingot using a wire saw.

An end material of a polycrystalline silicon ingot produced by the above-mentioned casting method is cut down to predetermined dimensions, to form a semiconductor ingot 31. After the semiconductor ingot 31 adheres to a slice base 33 made of glass, a carbon material, or a resin with adhesives such as epoxy adhesives, the semiconductor ingot 31 is cut into a plurality of slices using a wire saw device.

The semiconductor ingot 31 is made to adhere to a slice base 33, and is cut using one wire 35 composed of a piano wire having a diameter of approximately 100 to 300 µm, for example, while supplying a cutting fluid having abrasive grains of SiC or the like mixed with oil or water referred to as an abrasive grain slurry from upper several areas.

Spiral grooves are provided so as to be spaced a predetermined distance apart from one another on a main roller 38. The wire 35 is pulled out of a wire supply reel, and is arranged substantially parallel to one another with predetermined spacing by being wound so as to be engaged with a groove on the main roller 38.

A plurality of wires 35 stretched between the two main rollers 38 are moved to travel at high speed by thus rotating the two main rollers 38. A plurality of semiconductor ingots 31 are gradually lowered toward the wires 35 and pressed thereagainst, so that each of semiconductor ingots 31 is cut, to produce a semiconductor substrate having a thickness corresponding to the spacing between the wires 35.

In cutting using the wire saw device, a large number of semiconductor ingots 31 can be simultaneously cut, and a kerf loss (cutting loss) can be reduced because cutting precision is higher than that in another cutting method using an outer peripheral edge, an inner peripheral edge, or the like, and a wire being employed is thin.

A polycrystalline silicon substrate produced by this method resists repetitive use, and is obtained from a silicon ingot produced using a mold 1 whose assembly and disassembly work is simple, so that lower costs can be expected.

Example 1

Figure 17:
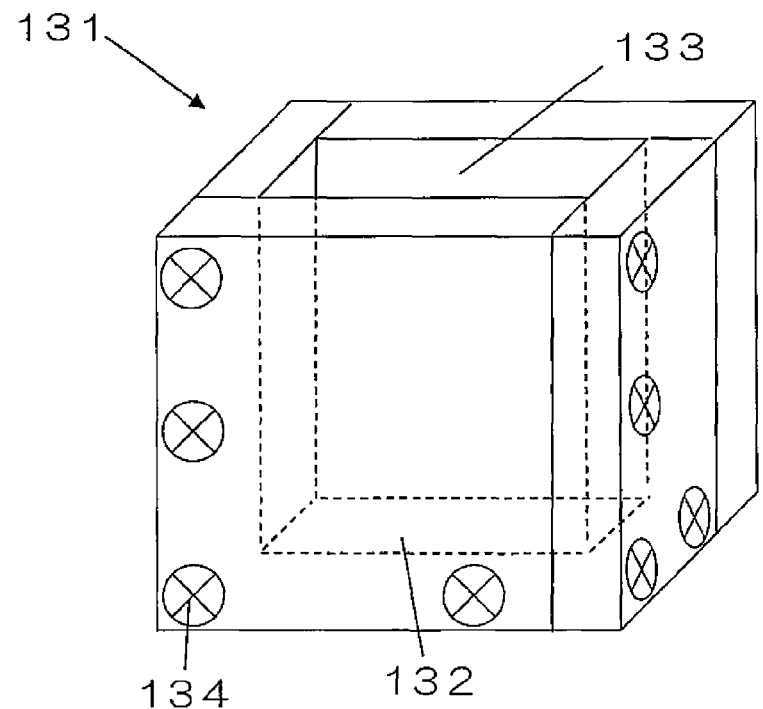
FIG. 17 is a perspective view showing a conventional mold.

The mold in the conventional example shown in FIG. 17 and the mold having the configuration according to the present invention shown in FIG. 7 were compared with each other.

In the conventional example, one bottom surface member (20 mm in thickness) composed of graphite having a mold release material composed of silicon nitride applied thereto of 2 mm in thickness and four lateral surface members (20 mm in thickness) were assembled in a box shape, and were fixed using 32 assembling screws (φ5 mm by 40 mm in length), to obtain a mold (220 mm by 220 mm in inside dimensions by 250 mm in height).

Twenty-two kg of a silicon melt was poured into the obtained mold, the top of the mold was heated to 1460° C. in an argon (Ar) atmosphere whose pressure was reduced to 100 Torr, the temperature of the mold was gradually lowered from the bottom of the mold to solidify the silicon melt in one direction, to obtain a silicon ingot having a height of approximately 200 mm.

In the example of the present invention, one bottom plate (20 mm in thickness) composed of graphite having a mold release material composed of silicon nitride applied thereto of 2 mm in thickness and four lateral surface members (20 mm in thickness) were assembled in a box shape on a mold fixing holder, and were fixed using a wedge 8 as shown in FIG. 7, to obtain a mold (220 mm by 220 mm in inside dimensions by 250 mm in height).

Twenty-two kg of a silicon melt was poured into the obtained mold, the top of the mold was heated to 1460° C. in an argon (Ar) atmosphere whose pressure was reduced to 100 Torr, the temperature of the mold was gradually lowered from the bottom of the mold to solidify the silicon melt in one direction, to obtain a silicon ingot having a height of approximately 200 mm.

Casting was repeated ten times by each of the two methods, to compare assembling work times of the mold, the presences or absences of leakage of the silicon melt, and wear conditions of the member.

In the conventional example, the average assembling time of the mold was 15 minutes; the number of times of leakage of the silicon melt was one; the number of times of replacement due to fracture of a mold fixing screw and wear of a thread was 22; the number of times of replacement due to wear of a thread processed in a bottom plate or a side plate was seven; and the number of times of replacement due to embedding of a screw that has fractured in a screw mounting hole processed in the bottom plate and the side plate was four.

On the other hand, in the one present invention, the average assembling time of the mold was four minutes; silicon never leaked; and all the members were in a usable state after ten times of casting.

Example 2

The mold in the conventional example shown in FIG. 17 and the mold having the configuration according to the present invention shown in FIG. 13 were compared with each other.

In the conventional example, one bottom surface member (20 mm in thickness) composed of graphite having a mold release material composed of silicon nitride applied thereto of 2 mm in thickness and four lateral surface members (20 mm in thickness) were assembled in a box shape, and were fixed using 40 assembling screws (φ5 mm by 40 mm in length), to obtain a mold (350 mm by 350 mm in inside dimensions by 350 mm in height).

Eighty-five kg of a silicon melt was poured into the obtained mold, the top of the mold was heated to 1460° C. in an argon (Ar) atmosphere, whose pressure was reduced to 100 Torr, the temperature of the mold was gradually lowered from the bottom of the mold to solidify the silicon melt in one direction, to obtain a silicon ingot having a height of approximately 300 mm.

In the example of the present invention, one bottom plate (10 mm in thickness) composed of graphite having a mold release material composed of silicon nitride applied thereto of 2 mm in thickness and four lateral surface members (2 mm in thickness) were assembled in a box shape on a mold fixing holder, and were fixed using a wedge 8 as shown in FIG. 7, to obtain a mold (350 mm by 350 mm in inside dimensions by 350 mm in height).

A frame-shaped member 15 was placed on an engaging surface 4a of a projection and a recess of the lateral surface member 3, to change the height of the projection or the recess positioned in the uppermost part of the lateral surface member 3, that is, a distance d shown in FIG. 1 in a range from 0.5 to 10 cm.

Eighty-five kg of a silicon melt was poured into the obtained mold, the top of the mold was heated to 1460° C. in an argon (Ar) atmosphere whose pressure was reduced to 100 Torr, the temperature of the mold was gradually lowered from the bottom of the mold to solidify the silicon melt, in one direction, to obtain a silicon ingot having a height of approximately 300 mm.

Casting was repeated ten times by each of the above-mentioned two methods, to compare the presences or absences of leakage of the silicon melt, and wear conditions of the member. Table 1 shows the results of the comparison.

TABLE 1

| Thickness of lateral surface member (cm) | d (cm) | Leakage of silicon melt (cm) | Number of times of damage to mold (times) |
|---|---|---|---|
| Conventional configuration | | 3 | 8 |
| 2 | 0.5 | 0 | 2 |
| 2 | 1 | 0 | 0 |
| 2 | 4 | 0 | 0 |
| 2 | 8 | 0 | 1 |
| 2 | 10 | 0 | 2 |

In the conventional example, the silicon melt leaked three times; and replacement was required eight out of ten times due to fracture of a mold fixing screw and wear of a thread, wear of a thread processed in a bottom plate or a side plate, and embedding of a screw that has fractured in a screw mounting hole processed in the bottom plate and the side plate.

On the other hand, in a case where the height of the projection or the recess positioned in the uppermost part of the lateral surface member 3, that is, the distance d shown in FIG. 1 was 1 to 4 cm, which are the most suitable conditions, the silicon melt did not leak, and replacement of the member was not required. In a case where the height of the projection or the recess in the uppermost part was 8 cm, replacement was required once due to warping deformation of the mold member. However, the silicon melt did not leak. In a case where the height of the projection or the recess was 0.5 cm and 10 cm other than the most suitable conditions, replacement was required. However, the number of times of replacement of the member was made smaller, as compared with that in the conventional configuration, so that the effect of the present invention was confirmed.

From the results, it was confirmed that the mold could be increased in size and thinned in the configuration according to the present invention.

What is claimed is:

1. A mold for producing a silicon ingot, comprising:
   a bottom surface member; and
   a plurality of lateral surface members combining with the bottom surface member,
   and each lateral surface member comprising a first engaging structure on a first lateral end thereof and a second engaging structure on a second lateral end thereof, one of the first and second engaging structures of one of the plurality of lateral surface members engages with one of the first and second engaging structures of another one of the plurality of lateral surface members,
   wherein the first and second engaging structures each comprises a projection and a recess, and
   wherein the plurality of lateral surface members are in contact with an outer peripheral side surface of the bottom surface member and are upright so as to surround the bottom surface member, and
   the mold for producing a silicon ingot further comprising:
   a mold holder configured for placing the bottom surface member and the plurality of lateral surface members that are combined, the mold holder being provided independently from the bottom surface member;
   a wedge receiver being removably provided on an upper surface of the mold holder; and
   a plurality of wedge members respectively positioned in clearances between the wedged receiver and outer peripheral surfaces of the plurality of lateral surface members.

2. The mold for producing a silicon ingot according to claim 1, wherein the number of the plurality of lateral surface members combining with the bottom surface member is four.

3. The mold for producing a silicon ingot according to claim 1, wherein each of the engaging structures comprises one or more engaging surfaces that are substantially level with a bottom surface of the bottom surface member, and a distance between an upper side of the lateral surface member and the engaging surface closest to the upper side is in a range of not less than 1 cm nor more than 8 cm.

4. The mold for producing a silicon ingot according to claim 1, wherein the shapes of the engaging structures are in a point-symmetrical relationship with each other and with respect to a center point of the lateral surface member.

5. The mold for producing a silicon ingot according to claim 1, wherein the wedge receiver is removable from the upper surface of the mold holder.

6. The mold for producing a silicon ingot according to claim 1, wherein
   there exists a plurality of wedge receivers, and
   a space between one of the plurality of wedge receivers and another one of the plurality of wedge receivers is adjustable, the another one wedge receiver is arranged at a position opposed to the one of the wedge receivers with the bottom surface member and the plurality of lateral surface members that are combined therebetween.

7. The mold for producing a silicon ingot according to claim 1, further comprising a frame-shaped member which continuously surrounds an outer periphery of the plurality of lateral surface members integrated by engaging with each other and is configured for constraining displacement of the plurality of lateral surface members.

8. The mold for producing a silicon ingot according to claim 1, further comprising:
   a frame-shaped member continuously surrounding an outer periphery of the plurality of lateral surface members integrated by engaging with each other, with a free space between the frame-shaped member and the plurality of lateral surface members; and
   a plurality of pressing jigs respectively arranged in clearances between the frame-shaped member and outer corners formed by the lateral surface members adjacent to each other, and configured for constraining displacement of the plurality of lateral surface members.

9. The mold for producing a silicon ingot according to claim 8, wherein one of the plurality of pressing jigs has two jig surfaces respectively contacting with outer peripheral surfaces of two of the plurality of lateral surface members, the outer peripheral surfaces form the outer corner of the mold for producing a silicon ingot.

10. The mold for producing a silicon ingot according to claim 9, wherein the one of the plurality of pressing jigs has a relief groove located corresponding to the outer corner of the mold for producing a silicon ingot so as not to directly contact with each other.

11. The mold for producing a silicon ingot according to claim 8, wherein the frame-shaped member has a projection in an inner periphery thereof, the projection contacts with the lateral surface member facing therewith for constraining displacement of the plurality of lateral surface members.

12. The mold for producing a silicon ingot according to claim 7, wherein each of the engaging structures comprises one or more engaging surfaces that are substantially level with the bottom surface of the bottom surface member, and the frame-shaped members are respectively arranged at positions of the engaging surfaces.

13. The mold for producing a silicon ingot according to claim 1, further comprising a mold release material applied to
   a mold inner surface comprising a surface of the bottom surface member and surfaces of the plurality of lateral surface members and
   locking sections formed by the bottom surface member and the plurality of lateral surface members.

14. A polycrystalline silicon substrate producing method, comprising:
   a step of producing a silicon ingot by using the mold for producing a silicon ingot according to any one of claims 1, 2, 3, 4, and 5-13; and
   a step of obtaining a polycrystalline silicon substrate from the silicon ingot.

15. The mold for producing a silicon ingot according to claim 1, wherein the projection and the recess are aligned along the lateral end of the lateral surface member.

16. The mold for producing a silicon ingot according to claim 1, wherein the projection and the recess of each of the first and second engaging structures are arranged in a lengthwise direction of the lateral surface member.

17. The mold for producing a silicon ingot according to claim 1, wherein inner side surfaces of the plurality of lateral surface members are in contact with an outer peripheral side surface of the bottom surface member and are upright so as to surround the bottom surface member.

18. The mold for producing a silicon ingot according to claim 17, wherein a plurality of wedge members respectively positioned in clearances between and contacting the wedge receiver and outer peripheral surfaces of the plurality of lateral surface members.

* * * * *